(12) United States Patent
Zhang et al.

(10) Patent No.: US 12,160,573 B2
(45) Date of Patent: Dec. 3, 2024

(54) INTRA BLOCK COPY WITH TRIANGULAR PARTITIONS

(71) Applicants: Beijing Bytedance Network Technology Co., Ltd., Beijing (CN); Bytedance Inc., Los Angeles, CA (US)

(72) Inventors: Li Zhang, San Diego, CA (US); Hongbin Liu, Beijing (CN); Kai Zhang, San Diego, CA (US); Yue Wang, Beijing (CN)

(73) Assignees: BEIJING BYTEDANCE NETWORK TECHNOLOGY CO., LTD., Beijing (CN); BYTEDANCE INC., Los Angeles, CA (US)

( * ) Notice: Subject to any disclaimer, the term of this patent is extended or adjusted under 35 U.S.C. 154(b) by 316 days.

(21) Appl. No.: 17/538,873

(22) Filed: Nov. 30, 2021

(65) Prior Publication Data
US 2022/0086441 A1 Mar. 17, 2022

Related U.S. Application Data

(63) Continuation of application No. PCT/CN2020/093918, filed on Jun. 2, 2020.

(51) Int. Cl.
*H04N 19/119* (2014.01)
*H04N 19/132* (2014.01)
(Continued)

(52) U.S. Cl.
CPC ......... *H04N 19/119* (2014.11); *H04N 19/132* (2014.11); *H04N 19/159* (2014.11); *H04N 19/176* (2014.11); *H04N 19/186* (2014.11)

(58) Field of Classification Search
CPC .... H04N 19/176; H04N 19/70; H04N 19/105; H04N 19/52; H04N 19/159;
(Continued)

(56) References Cited

U.S. PATENT DOCUMENTS 10,462,439 B2   10/2019   He et al.
2019/0104303 A1   4/2019   Xiu et al.
(Continued)

FOREIGN PATENT DOCUMENTS

CN   106375764 A   2/2017
WO   2013068562 A   5/2013
WO   2018106047 A1   6/2018

OTHER PUBLICATIONS

Bross et al. "Versatile Video Coding (Draft 5)," Joint Video Experts Team (JVET) of ITU-T SG 16 WP 3 and ISO/IEC JTC 1/SC 29/WG 11 14th Meeting: Geneva, CH, Mar. 19-27, 2019, document JVET-N1001, 2019.
(Continued)

*Primary Examiner* — Masum Billah
(74) *Attorney, Agent, or Firm* — Conley Rose, P.C.

(57) ABSTRACT

Intra block copy with triangular partitions is described. One example method includes determining for a conversion between a block of a video and a bitstream representation of the block, that at least one of intra block copy (IBC) mode, intra mode, inter mode and palette mode is applied to multiple sub-regions of the block, wherein the block is split into two or multiple triangular or wedgelet sub-regions; and performing the conversion based on the determination.

20 Claims, 25 Drawing Sheets

(51) Int. Cl.
H04N 19/159 (2014.01)
H04N 19/176 (2014.01)
H04N 19/186 (2014.01)

(58) Field of Classification Search
CPC .. H04N 19/132; H04N 19/186; H04N 19/593; H04N 19/119; H04N 19/11; H04N 19/513
USPC ......................................................... 375/240
See application file for complete search history.

(56) References Cited

U.S. PATENT DOCUMENTS

| | | | |
|---|---|---|---|
| 2020/0077089 A1* | 3/2020 | Lee | H04N 19/117 |
| 2020/0296389 A1* | 9/2020 | Wang | H04N 19/105 |
| 2021/0006787 A1 | 1/2021 | Zhang et al. | |
| 2021/0006788 A1 | 1/2021 | Zhang et al. | |
| 2021/0051324 A1 | 2/2021 | Zhang et al. | |
| 2021/0092379 A1 | 3/2021 | Zhang et al. | |
| 2021/0152846 A1 | 5/2021 | Zhang et al. | |
| 2021/0250602 A1 | 8/2021 | Zhang et al. | |
| 2021/0258575 A1 | 8/2021 | Zhang et al. | |
| 2021/0266562 A1 | 8/2021 | Zhang et al. | |
| 2021/0385451 A1 | 12/2021 | Zhang et al. | |
| 2022/0007053 A1 | 1/2022 | Hanhart et al. | |

OTHER PUBLICATIONS

Chen et al. "Algorithm Description of Joint Exploration Test Model 7 (JEM 7)," Joint Video Exploration Team (JVET) of ITU-T SG 16 WP 3 and ISO/IEC JTC 1/SC 29/WG 11 7th Meeting: Torino, IT, Jul. 13-21, 2017, document JVET-G1001, 2017.

Chiang et al. "CE10.1.1: Multi-Hypothesis Prediction for Improving AMVP Mode, Skip or Merge Mode, and Intra Mode," Joint Video Experts Team (JVET) of ITU-T SG 16 WP 3 and ISO/IEC JTC 1/SC 29/WG 11 12th Meeting: Macao, CN, Oct. 3-12, 2018, document JVET-L0100, 2018.

Jeong et al. "CE4 Ultimate Motion Vector Expression (Test 4.5.4)," Joint Video Experts Team (JVET) of ITU-T SG 16 WP 3 and ISO/IEC JTC 1/SC 29/WG 11 12th Meeting: Macao, CN, Oct. 3-12, 2018, document JVET-L0054, 2018.

"High Efficiency Video Coding," Series H: Audiovisual and Multimedia Systems: Infrastructure of Audiovisual Services—Coding of Moving Video, ITU-T Telecommunication Standardization Sector of ITU, H.265, Feb. 2018.

Liao et al. "CE10.3.1.b: Triangular Prediction Unit Mode," Joint Video Exploration Team (JVET) of ITU-T SG 16 WP 3 and ISO/IEC JTC 1/SC 29/WG 11 12th Meeting: Macao, CN, Oct. 3-12, 2018, document JVET-L0124, 2018.

Rosewarne et al. "High Efficiency Video Coding (HEVC) Test Model 16 (HM 16) Improved Encoder Description Update 7," Joint Collaborative Team on Video Coding (JCT-VC) of ITU-T SG16 WP3 and ISO/IEC JTC1/SC29/WG11 25th Meeting: Chengdu, CN, Oct. 14-21, 2016, document JCTVC-Y1002, 2016.

Sethuraman et al. "CE9: Results of DMVR Related Tests CE9.2.1 and CE9.2.2," Joint Video Experts Team (JVET) of ITU-T SG 16 WP 3 and ISO/IEC JTC 1/SC 29/WG 11 13th Meeting: Marrakech, MA, Jan. 9-18, 2019, document JVET-M0147, 2019.

Xu et al. "CE8-Related: Combination Test of JVET-N0176/JVET-N0317/JVET-N0382 on Simplification of IBC Vector Prediction," Joint Video Experts Team (JVET) of ITU-T SG 16 WP 3 and ISO/IEC JTC 1/SC 29/WG 11 14th Meeting: Geneva, CH, Mar. 19-27, 2019, document JVET-N0843, 2019.

phenix.it-sudparis.eu/jvet/doc_end_user/current_document.php?id=5755.

vcgit.hhi.fraunhofer.de/jvet/VVCSoftware_VTM/tags/VTM-4.0.

JEM-7.0: https://jvet.hhi.fraunhofer.de/svn/svn_HMJEMSoftware/tags/ HM-16.6-JEM-7.0.

International Search Report and Written Opinion from PCT/CN2020/093918 dated Aug. 25, 2020 (10 pages).

* cited by examiner

FIG. 7

INTRA BLOCK COPY WITH TRIANGULAR PARTITIONS

CROSS-REFERENCE TO RELATED APPLICATION

This application is a continuation of International Patent Application No. PCT/CN2020/093918, filed on Jun. 2, 2020, which claims the priority to and benefits of International Patent Application No. PCT/CN2019/089795, filed on Jun. 3, 2019. All the aforementioned patent applications are hereby incorporated by reference in their entireties.

TECHNICAL FIELD

This document is related to video and image coding and decoding technologies.

BACKGROUND

Digital video accounts for the largest bandwidth use on the internet and other digital communication networks. As the number of connected user devices capable of receiving and displaying video increases, it is expected that the bandwidth demand for digital video usage will continue to grow.

SUMMARY

The disclosed techniques may be used by video or image decoder or encoder embodiments in which a non-rectangular partitioning is used for dividing a block into multiple sub-blocks. For example, non-rectangular partitioning may include wedgelet partitioning or triangular partitioning.

In one example aspect, a method of processing video is disclosed. The method includes deciding (2402), during a conversion between a current video block that is partitioned into at least two sub-regions based on a wedgelet partitioning or a triangular partitioning and a bitstream representation of the current video block, that the conversion of each sub-region is based on a coding method that uses a current picture as a reference picture, determining (2404), based on the deciding, motion vectors used for the IBC coding of the multiple sub-regions; and performing (2406) the conversion using the two different motion vectors.

In another example aspect, a method of processing video is disclosed. The method includes deciding, during a conversion between a current video block that is partitioned into at least two sub-regions based on a wedgelet partitioning or a triangular partitioning and a bitstream representation of the current video block, that the conversion of one sub-region is based on a coding method that uses a current picture as a reference picture and the conversion of another sub-region is based on another coding mode that is different from the IBC coding mode; and performing the conversion based on the deciding.

In another example aspect, a method of processing video is disclosed. The method includes deciding, during a conversion between a current video block that is partitioned into at least two sub-regions based on a wedgelet partitioning or a triangular partitioning and a bitstream representation of the current video block, that the conversion of one sub-region is based on an intra coding mode and the conversion of another sub-region is based on another coding mode that is different from the intra coding mode; and performing the conversion based on the deciding.

In another example aspect, a method of processing video is disclosed. The method includes determining, during a conversion between a current video block that is partitioned into sub-regions based on a wedgelet partitioning or a triangular partitioning and a bitstream representation of the current video block, that the sub-regions are coded based on a palette coding mode and palettes used for at least two sub-regions are different from each other; and performing the conversion based on the determining.

In another example aspect, a method of processing video is disclosed. The method includes deciding, during a conversion between a current video block that is partitioned into at least two sub-regions based on a wedgelet partitioning or a triangular partitioning and a bitstream representation of the current video block, that the conversion of one sub-region is based on a palette coding mode and the conversion of another sub-region is based on another coding mode that is different from the palette coding mode; and performing the conversion based on the deciding.

In another example aspect, a method of processing video is disclosed. The method includes performing a conversion between a block of a component of video and a bitstream representation of the block using a method recited in any one of above clauses, such that a conversion between a corresponding block of another component of the video is performed using a different coding technique than that used for the conversion of the block.

In another example aspect, a method of processing video is disclosed. The method includes determining, during a conversion between a current video block that is partitioned into at least two sub-regions based on a wedgelet partitioning or a triangular partitioning and a bitstream representation of the current video block, a final prediction for the current video block using predictions of each sub-region; and performing the conversion based on the deciding.

In another example aspect, a method of processing video is disclosed. The method includes storing, during a conversion between a current video block that is partitioned into at least two sub-regions based on a wedgelet partitioning or a triangular partitioning and a bitstream representation of the current video block, motion information of a sub-region as motion information of the current video block; and using the motion information for conversion of the current video block or subsequent video blocks.

In another example aspect, a method of processing video is disclosed. The method includes determining, for a conversion between a block of a video and a bitstream representation of the block, that at least one of intra block copy (IBC) mode, intra mode, inter mode and palette mode is applied to multiple sub-regions of the block, wherein the block is split into two or multiple triangular or wedgelet sub-regions; and performing the conversion based on the determination.

In another example aspect, the above-described methods may be implemented by a video decoder apparatus that comprises a processor.

In another example aspect, the above-described methods may be implemented by a video encoder apparatus that comprises a processor.

In yet another example aspect, these methods may be embodied in the form of processor-executable instructions and stored on a computer-readable program medium.

These, and other, aspects are further described in the present document.

BRIEF DESCRIPTION OF THE DRAWINGS

FIG. 7 shows example of combined bi-predictive merge candidate.

DETAILED DESCRIPTION

Figure 1:
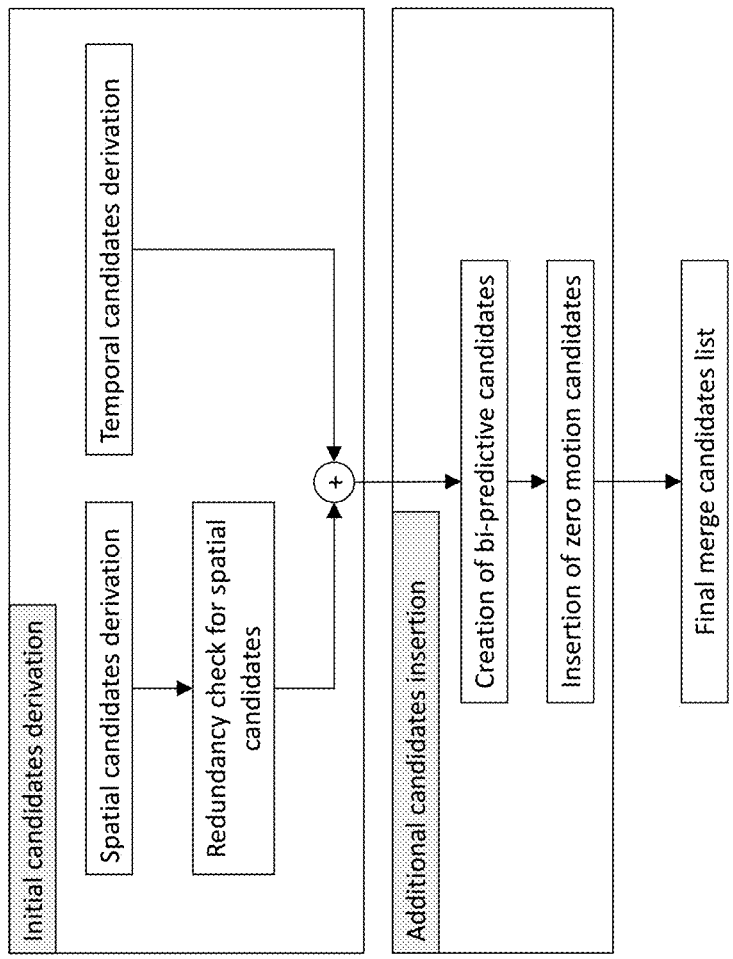
FIG. 1 shows a derivation process for merge candidate list construction.

The present document provides various techniques that can be used by a decoder of image or video bitstreams to improve the quality of decompressed or decoded digital video or images. For brevity, the term "video" is used herein to include both a sequence of pictures (traditionally called video) and individual images. Furthermore, a video encoder may also implement these techniques during the process of encoding in order to reconstruct decoded frames used for further encoding.

Section headings are used in the present document for ease of understanding and do not limit the embodiments and techniques to the corresponding sections. As such, embodiments from one section can be combined with embodiments from other sections.

1 Brief Summary

This patent document is related to video coding technologies. Specifically, it is related to the palette mode in video coding. It may be applied to the existing video coding standard like HEVC, or the standard (Versatile Video Coding) to be finalized. It may be also applicable to future video coding standards or video codec.

2 Initial Discussion

Video coding standards have evolved primarily through the development of the well-known ITU-T and ISO/IEC standards. The ITU-T produced H.261 and H.263, ISO/IEC produced MPEG-1 and MPEG-4 Visual, and the two organizations jointly produced the H.262/MPEG-2 Video and H.264/MPEG-4 Advanced Video Coding (AVC) and H.265/HEVC standards. Since H.262, the video coding standards are based on the hybrid video coding structure wherein temporal prediction plus transform coding are utilized. To explore the future video coding technologies beyond HEVC, Joint Video Exploration Team (JVET) was founded by VCEG and MPEG jointly in 2015. Since then, many new methods have been adopted by JVET and put into the reference software named Joint Exploration Model (JEM). In April 2018, the Joint Video Expert Team (JVET) between VCEG (Q6/16) and ISO/IEC JTC1 SC29/WG11 (MPEG) was created to work on the VVC standard targeting at 50% bitrate reduction compared to HEVC.

2.1 Inter Prediction in HEVC/H.265

For inter-coded coding units (CUs), it may be coded with one prediction unit (PU), 2 PUS according to partition mode. Each inter-predicted PU has motion parameters for one or two reference picture lists. Motion parameters include a motion vector and a reference picture index. Usage of one of the two reference picture lists may also be signalled using inter_pred_idc. Motion vectors may be explicitly coded as deltas relative to predictors.

When a CU is coded with skip mode, one PU is associated with the CU, and there are no significant residual coefficients, no coded motion vector delta or reference picture index. A merge mode is specified whereby the motion parameters for the current PU are obtained from neighbouring PUS, including spatial and temporal candidates. The merge mode can be applied to any inter-predicted PU, not only for skip mode. The alternative to merge mode is the explicit transmission of motion parameters, where motion vector (to be more precise, motion vector differences (MVD) compared to a motion vector predictor), corresponding reference picture index for each reference picture list and reference picture list usage are signalled explicitly per each PU. Such a mode is named Advanced motion vector prediction (AMVP) in this disclosure.

When signalling indicates that one of the two reference picture lists is to be used, the PU is produced from one block of samples. This is referred to as 'uni-prediction'. Uni-prediction is available both for P-slices and B-slices.

When signalling indicates that both of the reference picture lists are to be used, the PU is produced from two blocks of samples. This is referred to as 'bi-prediction'. Bi-prediction is available for B-slices only.

The following text provides the details on the inter prediction modes specified in HEVC. The description will start with the merge mode.

2.1.1 Reference Picture List

In HEVC, the term inter prediction is used to denote prediction derived from data elements (e.g., sample values or motion vectors) of reference pictures other than the current decoded picture. Like in H.264/AVC, a picture can be predicted from multiple reference pictures. The reference pictures that are used for inter prediction are organized in one or more reference picture lists. The reference index identifies which of the reference pictures in the list should be used for creating the prediction signal.

A single reference picture list, List 0, is used for a P slice and two reference picture lists, List 0 and List 1 are used for B slices. It should be noted reference pictures included in List 0/1 could be from past and future pictures in terms of capturing/display order.

2.1.2 Merge Mode
2.1.2.1 Derivation of Candidates for Merge Mode

When a PU is predicted using merge mode, an index pointing to an entry in the merge candidates list is parsed from the bitstream and used to retrieve the motion information. The construction of this list is specified in the HEVC standard and can be summarized according to the following sequence of steps:

Step 1: Initial candidates derivation
    Step 1.1: Spatial candidates derivation
    Step 1.2: Redundancy check for spatial candidates
    Step 1.3: Temporal candidates derivation
Step 2: Additional candidates insertion
    Step 2.1: Creation of bi-predictive candidates
    Step 2.2: Insertion of zero motion candidates These steps are also schematically depicted in FIG. 1. For spatial merge candidate derivation, a maximum of four merge candidates are selected among candidates that are located in five different positions. For temporal merge candidate derivation, a maximum of one merge candidate is selected among two candidates. Since constant number of candidates for each PU is assumed at decoder, additional candidates are generated when the number of candidates obtained from step 1 does not reach the maximum number of merge candidate (MaxNumMergeCand) which is signalled in slice header. Since the number of candidates is constant, index of best merge candidate is encoded using truncated unary binarization (TU). If the size of CU is equal to 8, all the PUs of the current CU share a single merge candidate list, which is identical to the merge candidate list of the 2N×2N prediction unit.

In the following, the operations associated with the aforementioned steps are detailed.

2.1.2.2 Spatial Candidates Derivation

Figure 2:
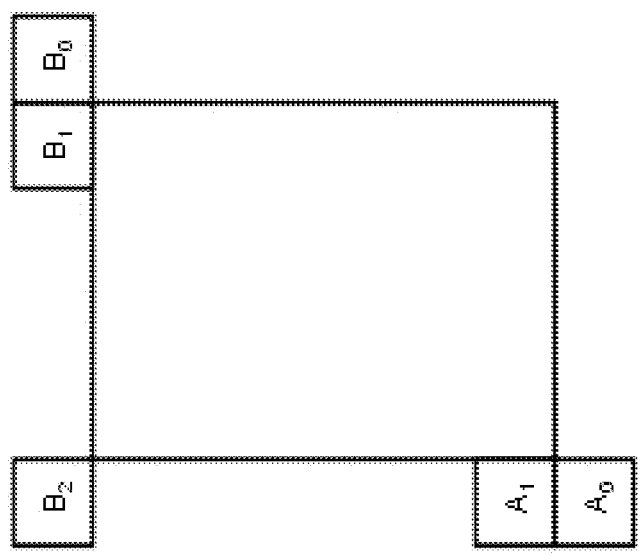
FIG. 2 shows an example of positions of spatial merge candidates.
Figure 3:
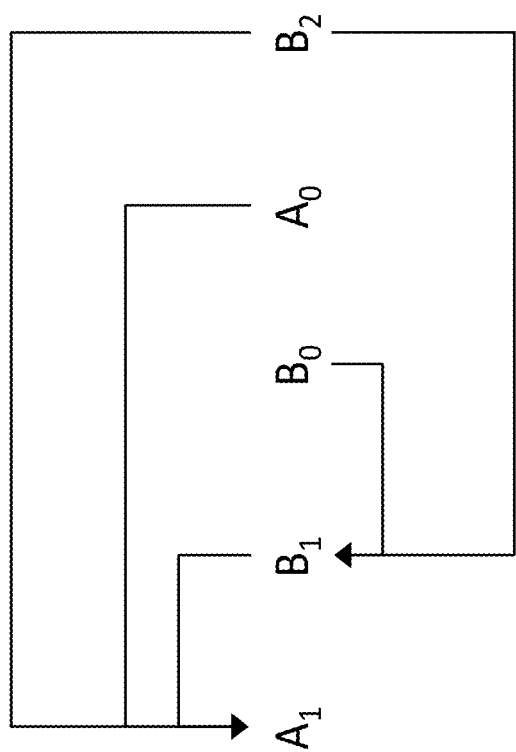
FIG. 3 shows an example of candidate pairs considered for redundancy check of spatial merge candidates.
Figure 4:
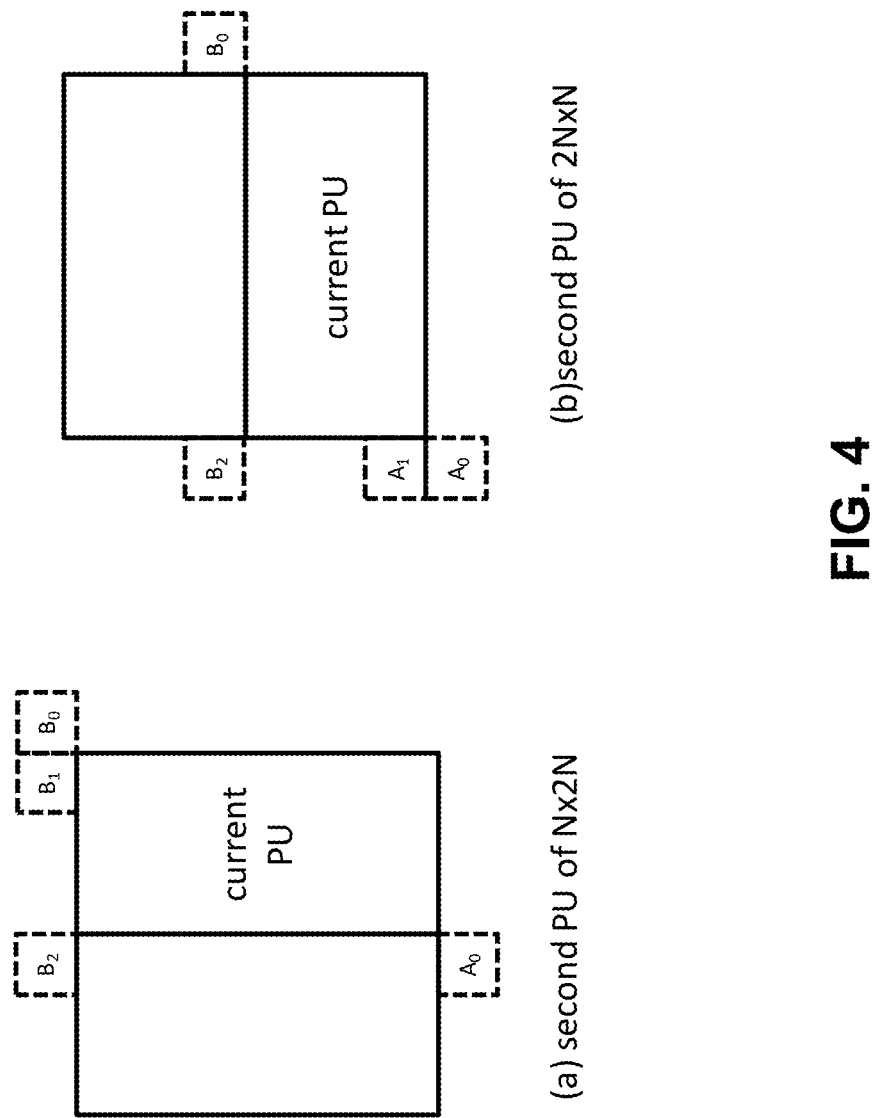
FIG. 4 shows an example positions for the second PU of N×2N and 2N×N partitions.

In the derivation of spatial merge candidates, a maximum of four merge candidates are selected among candidates located in the positions depicted in FIG. 2. The order of derivation is $A_1$, $B_1$, $B_0$, $A_0$ and $B_2$. Position $B_2$ is considered only when any PU of position $A_1$, $B_1$, $B_0$, $A_0$ is not available (e.g. because it belongs to another slice or tile) or is intra coded. After candidate at position $A_1$ is added, the addition of the remaining candidates is subject to a redundancy check which ensures that candidates with same motion information are excluded from the list so that coding efficiency is improved. To reduce computational complexity, not all possible candidate pairs are considered in the mentioned redundancy check. Instead only the pairs linked with an arrow in FIG. 3 are considered and a candidate is only added to the list if the corresponding candidate used for redundancy check has not the same motion information. Another source of duplicate motion information is the "second PU" associated with partitions different from 2N×2N. As an example, FIG. 4 depicts the second PU for the case of N×2N and 2N×N, respectively. When the current PU is partitioned as N×2N, candidate at position $A_1$ is not considered for list construction. In fact, by adding this candidate will lead to two prediction units having the same motion information, which is redundant to just have one PU in a coding unit. Similarly, position $B_1$ is not considered when the current PU is partitioned as 2N×N.

2.1.2.3 Temporal Candidates Derivation

Figure 5:
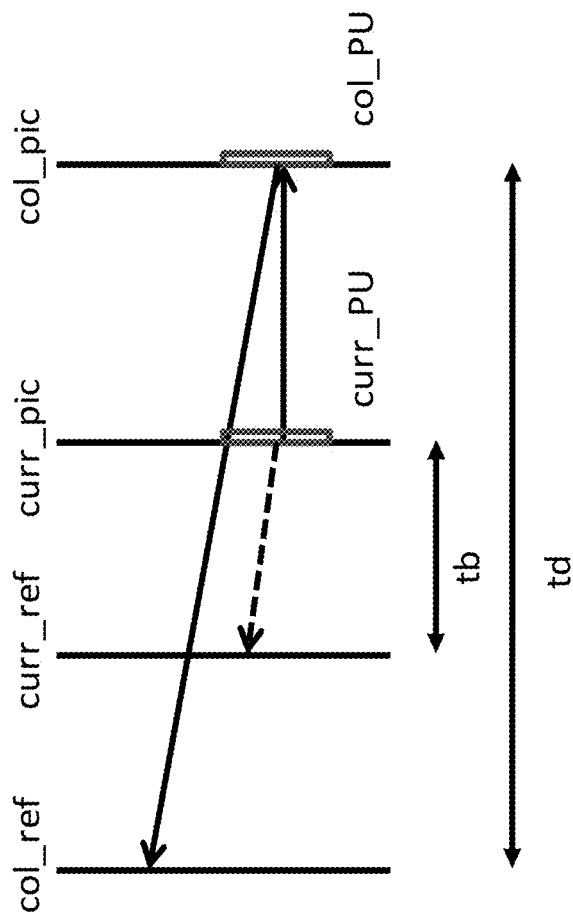
FIG. 5 shows examples of illustration of motion vector scaling for temporal merge candidate.

In this step, only one candidate is added to the list. Particularly, in the derivation of this temporal merge candidate, a scaled motion vector is derived based on co-located PU belonging to the picture which has the smallest POC difference with current picture within the given reference picture list. The reference picture list to be used for derivation of the co-located PU is explicitly signalled in the slice header. The scaled motion vector for temporal merge candidate is obtained as illustrated by the dotted line in FIG. 5, which is scaled from the motion vector of the co-located PU using the POC distances, tb and td, where tb is defined to be the POC difference between the reference picture of the current picture and the current picture and td is defined to be the POC difference between the reference picture of the co-located picture and the co-located picture. The reference picture index of temporal merge candidate is set equal to zero. A practical realization of the scaling process is described in the HEVC specification. For a B-slice, two motion vectors, one is for reference picture list 0 and the other is for reference picture list 1, are obtained and combined to make the bi-predictive merge candidate.

Figure 6:
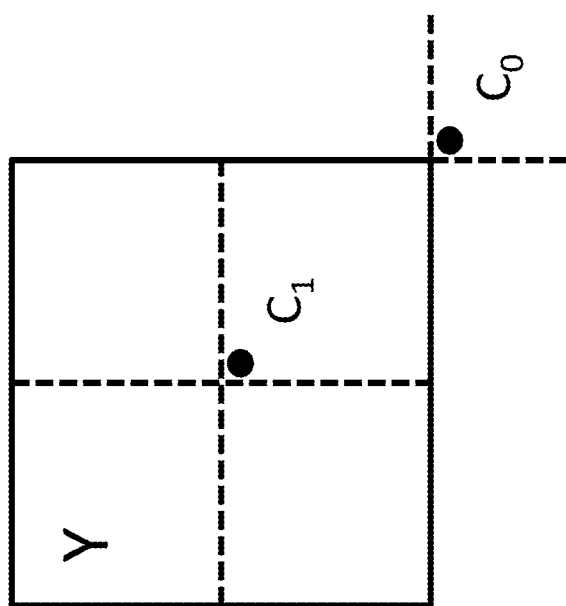
FIG. 6 shows an example of candidate positions for temporal merge candidate, C0 and C1.

In the co-located PU (Y) belonging to the reference frame, the position for the temporal candidate is selected between candidates $C_0$ and $C_1$, as depicted in FIG. 6. If PU at position $C_0$ is not available, is intra coded, or is outside of the current coding tree unit (CTU aka. LCU, largest coding unit) row, position $C_1$ is used. Otherwise, position $C_0$ is used in the derivation of the temporal merge candidate.

2.1.2.4 Additional Candidates Insertion

Figure 7:
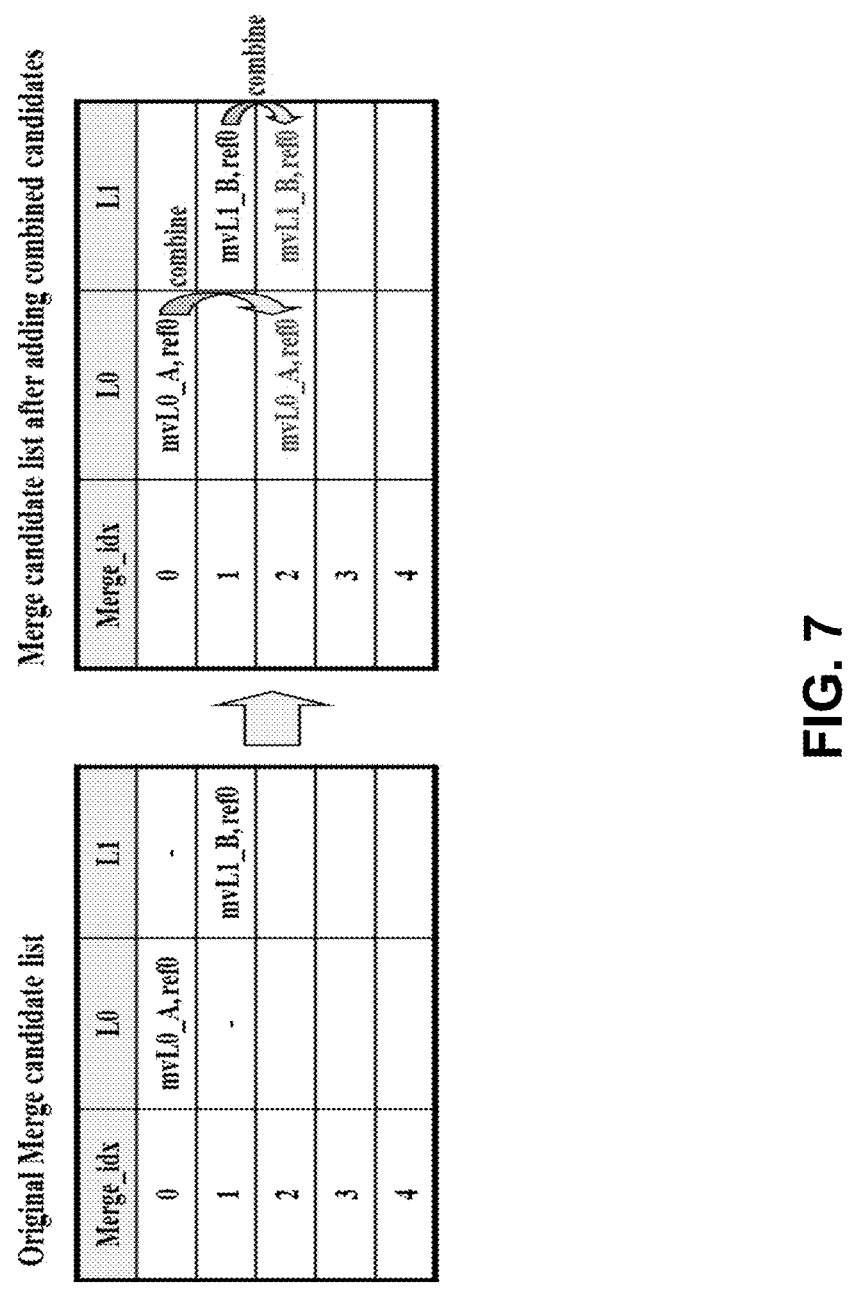

Besides spatial and temporal merge candidates, there are two additional types of merge candidates: combined bi-predictive merge candidate and zero merge candidate. Combined bi-predictive merge candidates are generated by utilizing spatial and temporal merge candidates. Combined bi-predictive merge candidate is used for B-Slice only. The combined bi-predictive candidates are generated by combining the first reference picture list motion parameters of an initial candidate with the second reference picture list motion parameters of another. If these two tuples provide different motion hypotheses, they will form a new bi-predictive candidate. As an example, FIG. 7 depicts the case when two candidates in the original list (on the left), which have mvL0 and refIdxL0 or mvL1 and refIdxL1, are used to create a combined bi-predictive merge candidate added to the final list (on the right). There are numerous rules regarding the combinations which are considered to generate these additional merge candidates.

Zero motion candidates are inserted to fill the remaining entries in the merge candidates list and therefore hit the MaxNumMergeCand capacity. These candidates have zero spatial displacement and a reference picture index which starts from zero and increases every time a new zero motion candidate is added to the list. Finally, no redundancy check is performed on these candidates.

2.1.3 AMVP

AMVP exploits spatio-temporal correlation of motion vector with neighbouring PUs, which is used for explicit transmission of motion parameters. For each reference picture list, a motion vector candidate list is constructed by firstly checking availability of left, above temporally neighbouring PU positions, removing redundant candidates and adding zero vector to make the candidate list to be constant length. Then, the encoder can select the best predictor from the candidate list and transmit the corresponding index indicating the chosen candidate. Similarly with merge index signalling, the index of the best motion vector candidate is encoded using truncated unary. The maximum value to be encoded in this case is 2 (see FIG. 8). In the following sections, details about derivation process of motion vector prediction candidate are provided.

2.1.3.1 Derivation of AMVP Candidates

Figure 8:
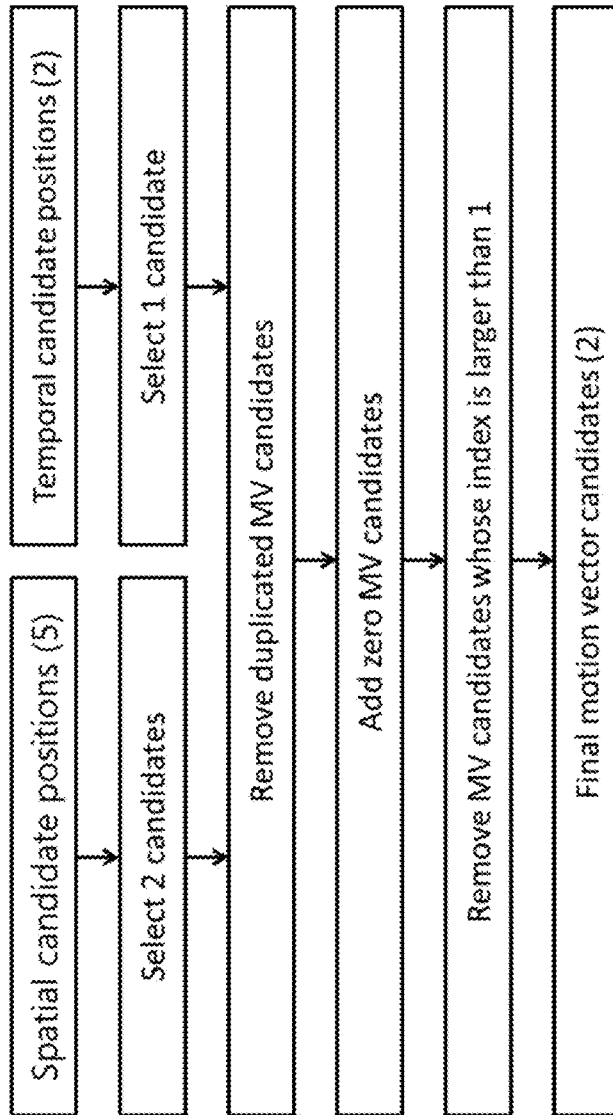
FIG. 8 shows examples of derivation process for motion vector prediction candidates.

FIG. 8 summarizes derivation process for motion vector prediction candidate.

In motion vector prediction, two types of motion vector candidates are considered: spatial motion vector candidate and temporal motion vector candidate. For spatial motion vector candidate derivation, two motion vector candidates are eventually derived based on motion vectors of each PU located in five different positions as depicted in FIG. 2.

For temporal motion vector candidate derivation, one motion vector candidate is selected from two candidates, which are derived based on two different co-located positions. After the first list of spatio-temporal candidates is made, duplicated motion vector candidates in the list are removed. If the number of potential candidates is larger than two, motion vector candidates whose reference picture index within the associated reference picture list is larger than 1 are removed from the list. If the number of spatio-temporal motion vector candidates is smaller than two, additional zero motion vector candidates is added to the list.

2.1.3.2 Spatial Motion Vector Candidates

In the derivation of spatial motion vector candidates, a maximum of two candidates are considered among five potential candidates, which are derived from PUs located in positions as depicted in FIG. 2, those positions being the same as those of motion merge. The order of derivation for the left side of the current PU is defined as $A_0, A_1$, and scaled $A_0$, scaled $A_1$. The order of derivation for the above side of the current PU is defined as $B_0, B_1, B_2$, scaled $B_0$, scaled $B_1$, scaled $B_2$. For each side there are therefore four cases that can be used as motion vector candidate, with two cases not required to use spatial scaling, and two cases where spatial scaling is used. The four different cases are summarized as follows.

No spatial scaling
  (1) Same reference picture list, and same reference picture index (same POC)
  (2) Different reference picture list, but same reference picture (same POC)
Spatial scaling
  (3) Same reference picture list, but different reference picture (different POC)
  (4) Different reference picture list, and different reference picture (different POC)

The no-spatial-scaling cases are checked first followed by the spatial scaling. Spatial scaling is considered when the POC is different between the reference picture of the neighbouring PU and that of the current PU regardless of reference picture list. If all PUs of left candidates are not available or are intra coded, scaling for the above motion vector is allowed to help parallel derivation of left and above MV candidates. Otherwise, spatial scaling is not allowed for the above motion vector.

Figure 9:
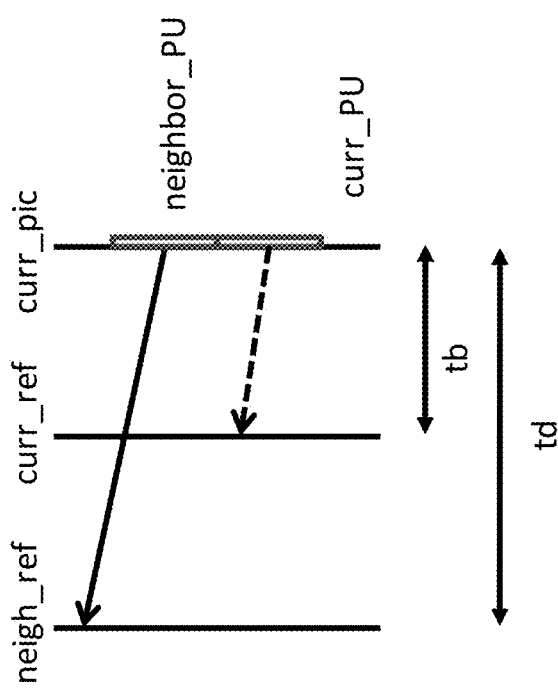
FIG. 9 shows an example illustration of motion vector scaling for spatial motion vector candidate.

In a spatial scaling process, the motion vector of the neighbouring PU is scaled in a similar manner as for temporal scaling, as depicted as FIG. 9. The main difference is that the reference picture list and index of current PU is given as input; the actual scaling process is the same as that of temporal scaling.

2.1.3.3 Temporal Motion Vector Candidates

Apart for the reference picture index derivation, all processes for the derivation of temporal merge candidates are the same as for the derivation of spatial motion vector candidates (see FIG. 6). The reference picture index is signalled to the decoder.

2.2 Inter Prediction Methods in VVC

There are several new coding tools for inter prediction improvement, such as Adaptive Motion Vector difference Resolution (AMVR) for signaling MVD, Merge with Motion Vector Differences (MMVD), Triangular prediction mode (TPM), Combined intra-inter prediction (CIIP), Advanced TMVP (ATMVP, aka SbTMVP), affine prediction mode, Generalized Bi-Prediction (GBI), Decoder-side Motion Vector Refinement (DMVR) and Bi-directional Optical flow (BIO, a.k.a BDOF).

There are three different merge list construction processes supported in VVC:
  1) Sub-block merge candidate list: it includes ATMVP and affine merge candidates. One merge list construction process is shared for both affine modes and ATMVP mode. Here, the ATMVP and affine merge candidates may be added in order. Sub-block merge list size is signaled in slice header, and maximum value is 5.
  2) Regular merge list: For remaining coding blocks, one merge list construction process is shared. Here, the spatial/temporal/HMVP, pairwise combined bi-prediction merge candidates and zero motion candidates may be inserted in order. Regular merge list size is signaled in slice header, and maximum value is 6. MMVD, TPM, CIIP rely on the regular merge list.
  3) IBC merge list: it is done in a similar way as the regular merge list.

Similarly, there are three AMVP lists supported in VVC:
  1) Affine AMVP candidate list
  2) Regular AMVP candidate list
  3) IBC AMVP candidate list: the same construction process as the IBC merge list

2.2.1 Coding Block Structure in VVC

In VVC, a Quad-Tree/Binary Tree/Ternary-Tree (QT/BT/TT) structure is adopted to divide a picture into square or rectangle blocks.

Besides QT/BT/TT, separate tree (a.k.a. Dual coding tree) is also adopted in VVC for I-frames. With separate tree, the coding block structure are signaled separately for the luma and chroma components.

In addition, the CU is set equal to PU and TU, except for blocks coded with a couple of specific coding methods (such as intra sub-partition prediction wherein PU is equal to TU, but smaller than CU, and sub-block transform for inter-coded blocks wherein PU is equal to CU, but TU is smaller than PU).

2.2.2 Affine Prediction Mode

Figure 10:
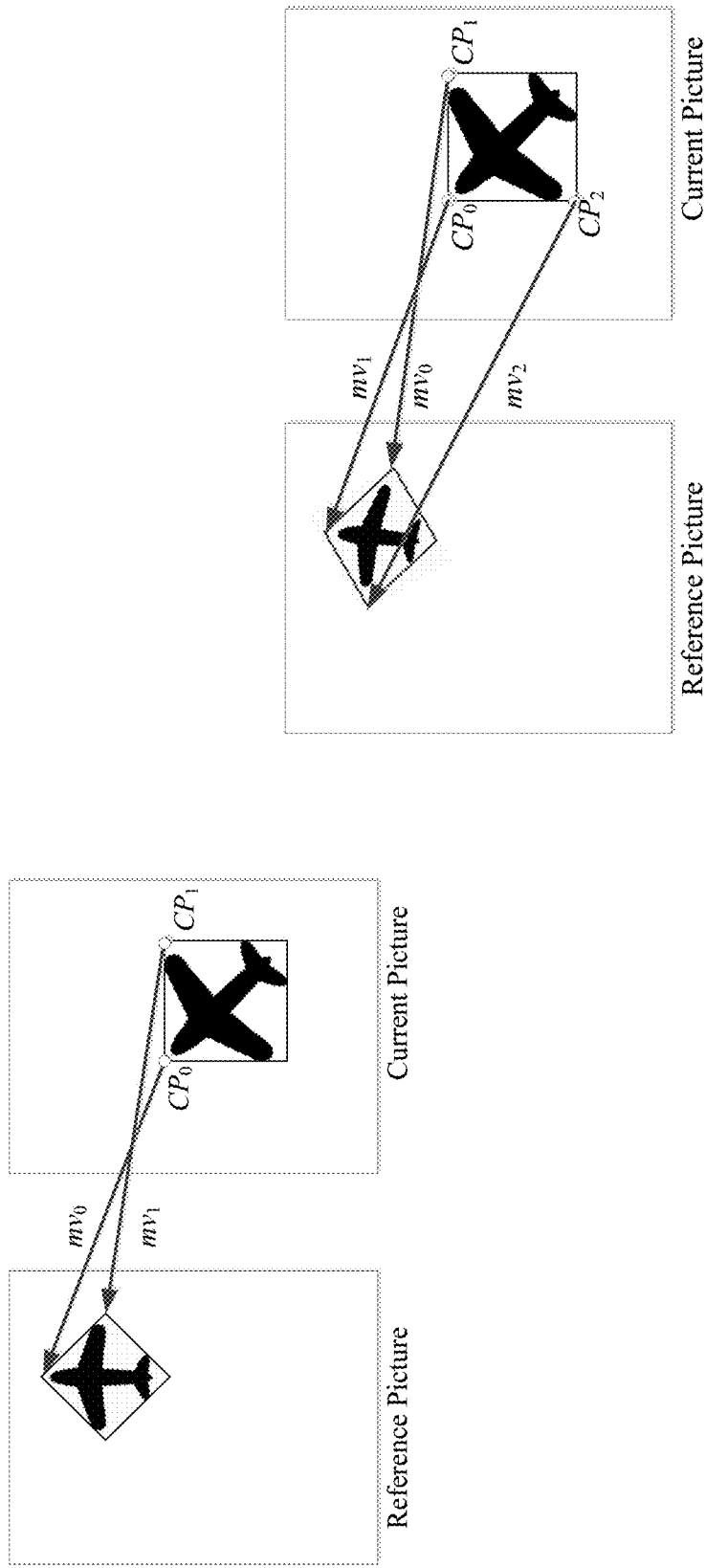
FIG. 10 shows an example simplified affine motion model for 4-parameter affine mode (left) and 6-parameter affine model (right).

In HEVC, only translation motion model is applied for motion compensation prediction (MCP). While in the real world, there are many kinds of motion, e.g. zoom in/out, rotation, perspective motions and the other irregular motions. In VVC, a simplified affine transform motion compensation prediction is applied with 4-parameter affine model and 6-parameter affine model. As shown FIG. 10, the affine motion field of the block is described by two control point motion vectors (CPMVs) for the 4-parameter affine model and 3 CPMVs for the 6-parameter affine model.

The motion vector field (MVF) of a block is described by the following equations with the 4-parameter affine model (wherein the 4-parameter are defined as the variables a, b, e and f) in equation (1) and 6-parameter affine model (wherein the 4-parameter are defined as the variables a, b, c, d, e and f) in equation (2) respectively:

$$\begin{cases} mv^h(x, y) = ax - by + e = \frac{(mv_1^h - mv_0^h)}{w}x - \frac{(mv_1^v - mv_0^v)}{w}y + mv_0^h \\ mv^v(x, y) = bx + ay + f = \frac{(mv_1^v - mv_0^v)}{w}x + \frac{(mv_1^h - mv_0^h)}{w}y + mv_0^v \end{cases} \quad (1)$$

$$\begin{cases} mv^h(x, y) = ax + cy + e = \frac{(mv_1^h - mv_0^h)}{w}x + \frac{(mv_2^h - mv_0^h)}{h}y + mv_0^h \\ mv^v(x, y) = bx + dy + f = \frac{(mv_1^v - mv_0^v)}{w}x + \frac{(mv_2^v - mv_0^v)}{h}y + mv_0^v \end{cases} \quad (2)$$

where ($mv^h_0$, $mv^h_0$) is motion vector of the top-left corner control point, and ($mv^h_1$, $mv^h_1$) is motion vector of the top-right corner control point and ($mv^h_2$, $mv^h_2$) is motion vector of the bottom-left corner control point, all of the three motion vectors are called control point motion vectors (CPMV), (x, y) represents the coordinate of a representative point relative to the top-left sample within current block and ($mv^h(x,y)$, $mv^v(x,y)$) is the motion vector derived for a sample located at (x, y). The CP motion vectors may be signaled (like in the affine AMVP mode) or derived on-the-fly (like in the affine merge mode). w and h are the width and height of the current block. In practice, the division is implemented by right-shift with a rounding operation. In VTM, the representative point is defined to be the center position of a sub-block, e.g., when the coordinate of the left-top corner of a sub-block relative to the top-left sample within current block is (xs, ys), the coordinate of the representative point is defined to be (xs+2, ys+2). For each sub-block (i.e., 4×4 in VTM), the representative point is utilized to derive the motion vector for the whole sub-block.

Figure 11:
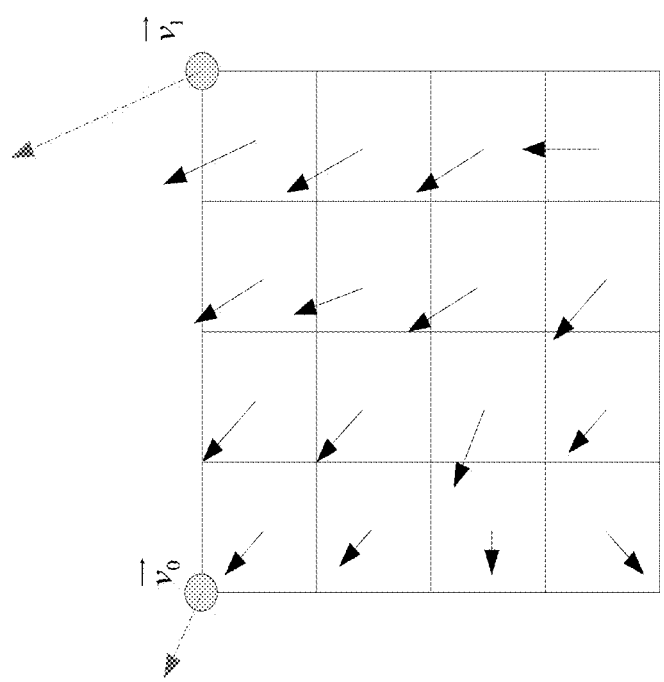
FIG. 11 shows an example of affine motion vector field per sub-block.

In order to further simplify the motion compensation prediction, sub-block based affine transform prediction is applied. To derive motion vector of each M×N (both M and N are set to 4 in current VVC) sub-block, the motion vector of the center sample of each sub-block, as shown in FIG. 11, is calculated according to Equation (1) and (2), and rounded to 1/16 fraction accuracy. Then the motion compensation interpolation filters for 1/16-pel are applied to generate the prediction of each sub-block with derived motion vector. The interpolation filters for 1/16-pel are introduced by the affine mode.

After MCP, the high accuracy motion vector of each sub-block is rounded and saved as the same accuracy as the normal motion vector.

2.2.3 MERGE for Whole Block
2.2.3.1 Merge List Construction of Translational Regular Merge Mode
2.2.3.1.1 History-Based Motion Vector Prediction (HMVP)

Different from the merge list design, in VVC, the history-based motion vector prediction (HMVP) method is employed.

Figure 12:
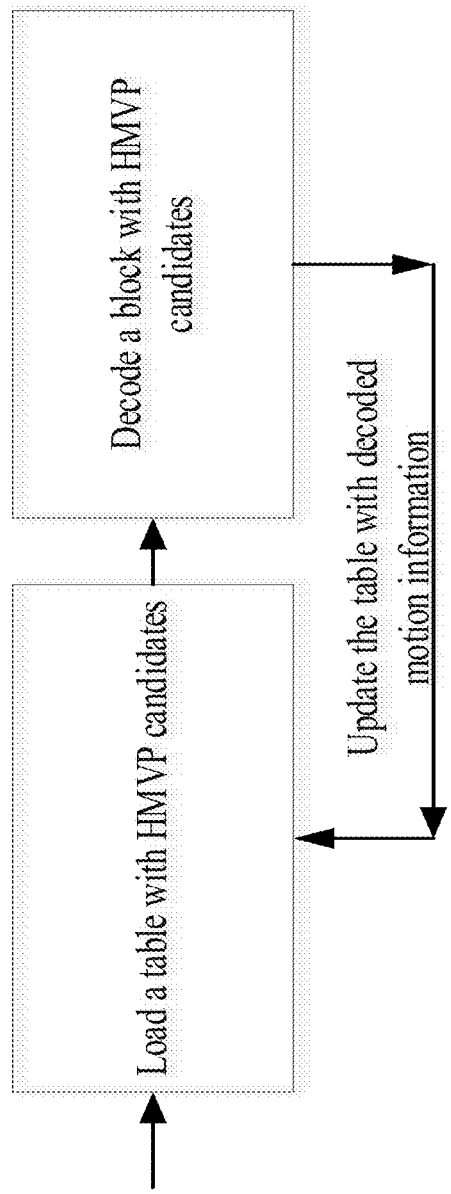
FIG. 12 shows an example Candidates position for affine merge mode.

In HMVP, the previously coded motion information is stored. The motion information of a previously coded block is defined as an HMVP candidate. Multiple HMVP candi-
dates are stored in a table, named as the HMVP table, and this table is maintained during the encoding/decoding process on-the-fly. The HMVP table is emptied when starting coding/decoding a new tile/LCU row/a slice. Whenever there is an inter-coded block and non-sub-block, non-TPM mode, the associated motion information is added to the last entry of the table as a new HMVP candidate. The overall coding flow is depicted in FIG. 12.

2.2.3.1.2 Regular Merge List Construction Process

Figure 13:
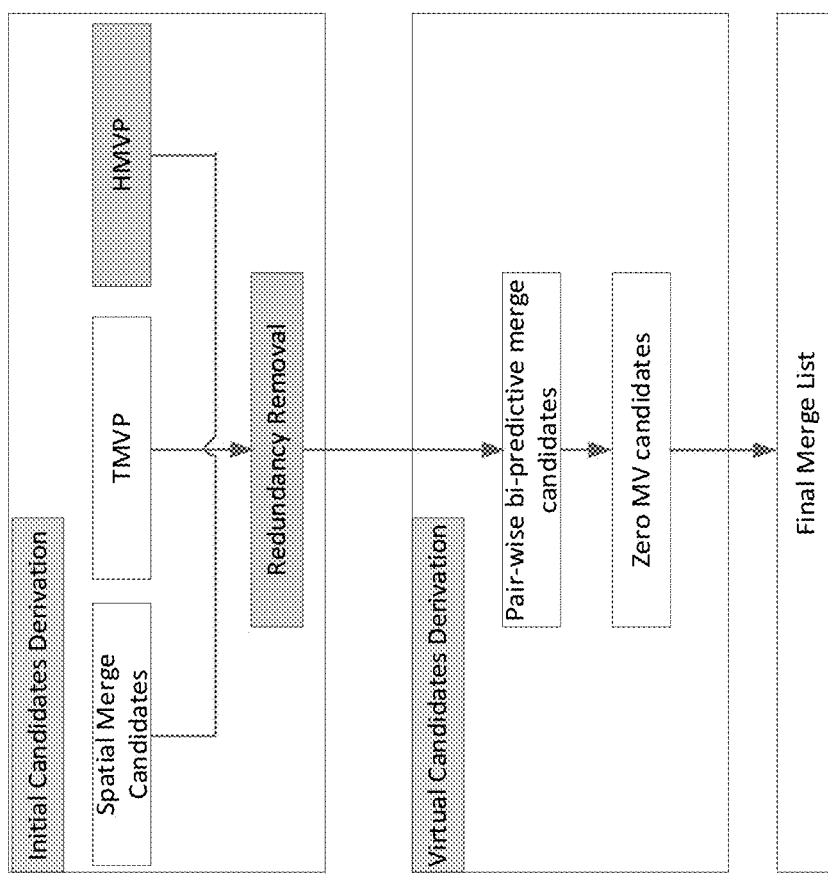
FIG. 13 shows an example of Modified merge list construction process.
Figure 14:
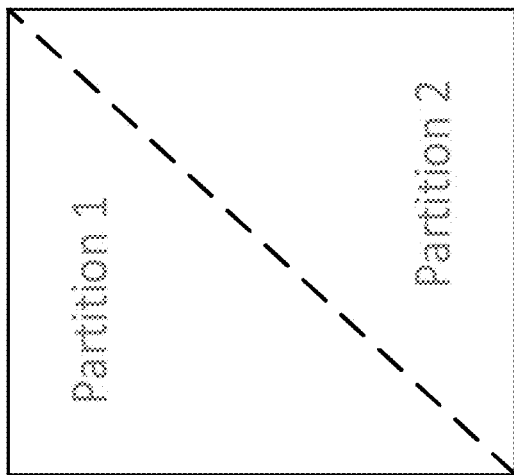
FIG. 14 shows an example of triangle partition based inter prediction.
Figure 14:
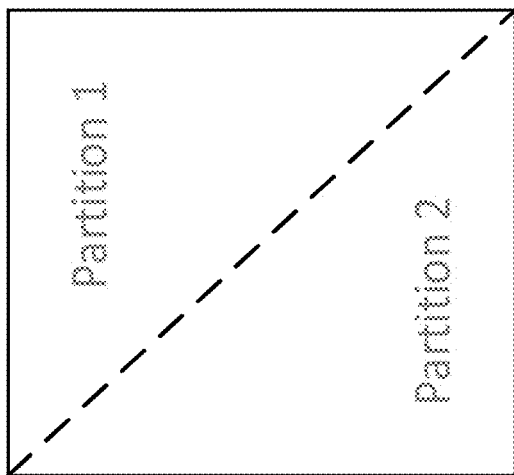
Figure 15:
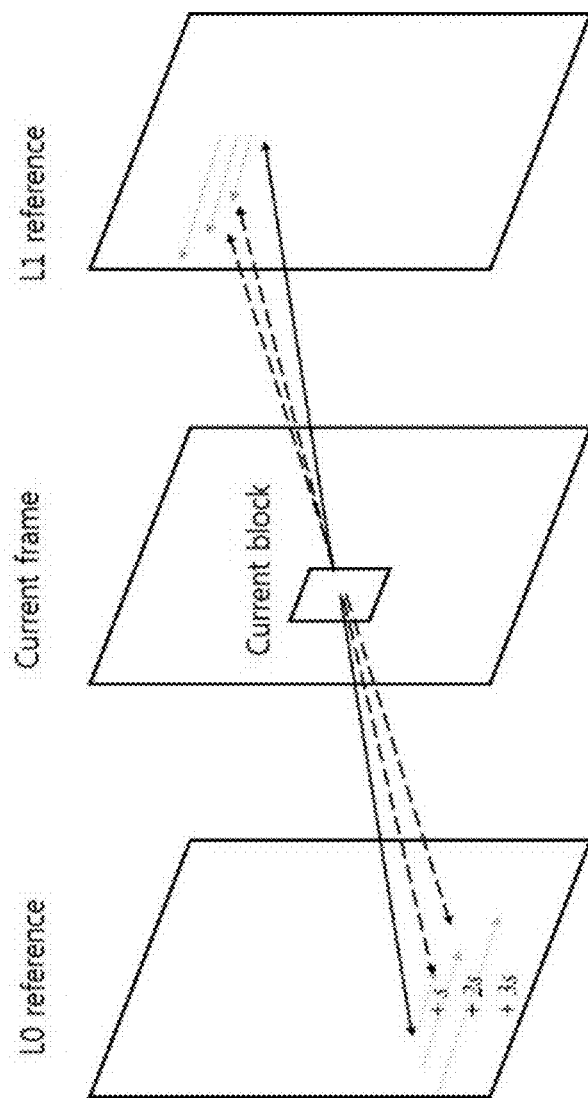
FIG. 15 shows an example of ultimate motion vector expression (UMVE) search process.
Figure 16:
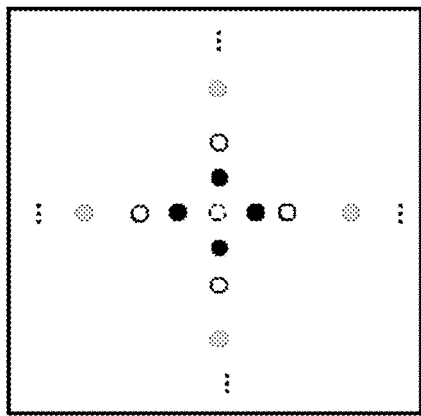
FIG. 16 shows an example of UMVE search points.
Figure 16:
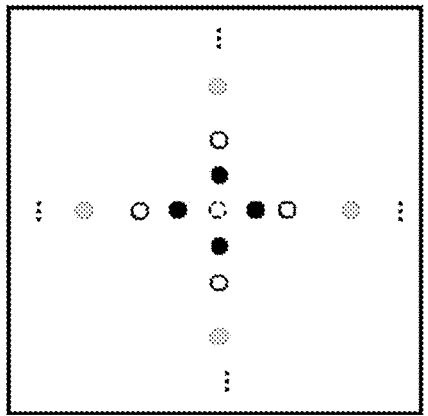

The construction of the regular merge list (for translational motion) can be summarized according to the following sequence of steps:

Step 1: Derivation of spatial candidates
Step 2: Insertion of HMVP candidates
Step 3: Insertion of pairwise average candidates
Step 4: default motion candidates HMVP candidates could be used in both AMVP and merge candidate list construction processes. FIG. 13 depicts The modified merge candidate list construction process (highlighted in blue). When the merge candidate list is not full after the TMVP candidate insertion, HMVP candidates stored in the HMVP table could be utilized to fill in the merge candidate list. Considering that one block usually has a higher correlation with the nearest neighbouring block in terms of motion information, the HMVP candidates in the table are inserted in a descending order of indices. The last entry in the table is firstly added to the list, while the first entry is added in the end. Similarly, redundancy removal is applied on the HMVP candidates. Once the total number of available merge candidates reaches the maximal number of merge candidates allowed to be signaled, the merge candidate list construction process is terminated.

It is noted that all the spatial/temporal/HMVP candidate shall be coded with non-IBC mode. Otherwise, it is not allowed to be added to the regular merge candidate list.

HMVP table contains up to 5 regular motion candidates and each of them is unique.

2.2.3.2 Triangular Prediction Mode (TPM)

In VTM4, a triangle partition mode is supported for inter prediction. The triangle partition mode is only applied to CUs that are 8×8 or larger and are coded in merge mode but not in MMVD or CIIP mode. For a CU satisfying these conditions, a CU-level flag is signalled to indicate whether the triangle partition mode is applied or not.

When this mode is used, a CU is split evenly into two triangle-shaped partitions, using either the diagonal split or the anti-diagonal split, as depicted in FIG. 13. Each triangle partition in the CU is inter-predicted using its own motion; only uni-prediction is allowed for each partition, that is, each partition has one motion vector and one reference index. The uni-prediction motion constraint is applied to ensure that same as the conventional bi-prediction, only two motion compensated prediction are needed for each CU.

If the CU-level flag indicates that the current CU is coded using the triangle partition mode, a flag indicating the direction of the triangle partition (diagonal or anti-diagonal), and two merge indices (one for each partition) are further signalled. After predicting each of the triangle partitions, the sample values along the diagonal or anti-diagonal edge are adjusted using a blending processing with adaptive weights. This is the prediction signal for the whole CU and transform and quantization process will be applied to the whole CU as in other prediction modes. Finally, the motion field of a CU predicted using the triangle partition mode is stored in 4×4 units.

The regular merge candidate list is re-used for triangle partition merge prediction with no extra motion vector pruning. For each merge candidate in the regular merge candidate list, one and only one of its L0 or L1 motion vector is used for triangle prediction. In addition, the order of selecting the L0 vs. L1 motion vector is based on its merge index parity. With this scheme, the regular merge list can be directly used.

2.2.3.3 MMVD

Ultimate motion vector expression (UMVE, also known as MMVD) is presented. UMVE is used for either skip or merge modes with a proposed motion vector expression method.

UMVE re-uses merge candidate as same as those included in the regular merge candidate list in VVC. Among the merge candidates, a base candidate can be selected, and is further expanded by the proposed motion vector expression method.

UMVE provides a new motion vector difference (MVD) representation method, in which a starting point, a motion magnitude and a motion direction are used to represent a MVD.

This proposed technique uses a merge candidate list as it is. But only candidates which are default merge type (MRG_TYPE_DEFAULT_N) are considered for UMVE's expansion.

Base candidate index defines the starting point. Base candidate index indicates the best candidate among candidates in the list as follows.

TABLE 1

Base candidate IDX

| Base candidate IDX | | | | |
|---|---|---|---|---|
| | 0 | 1 | 2 | 3 |
| $N^{th}$ MVP | $1^{st}$ MVP | $2^{nd}$ MVP | $3^{rd}$ MVP | $4^{th}$ MVP |

If the number of base candidate is equal to 1, Base candidate IDX is not signaled.

Distance index is motion magnitude information. Distance index indicates the pre-defined distance from the starting point information. Pre-defined distance is as follows:

TABLE 2

Distance IDX

| Distance IDX | 0 | 1 | 2 | 3 | 4 | 5 | 6 | 7 |
|---|---|---|---|---|---|---|---|---|
| Pixel distance | ¼-pel | ½-pel | 1-pel | 2-pel | 4-pel | 8-pel | 16-pel | 32-pel |

Direction index represents the direction of the MVD relative to the starting point. The direction index can represent of the four directions as shown below.

TABLE 3

Direction IDX

| Direction IDX | 00 | 01 | 10 | 11 |
|---|---|---|---|---|
| x-axis | + | − | N/A | N/A |
| y-axis | N/A | N/A | + | − |

UMVE flag is signaled right after sending a skip flag or merge flag. If skip or merge flag is true, UMVE flag is parsed. If UMVE flag is equal to 1, UMVE syntaxes are parsed. But, if not 1, AFFINE flag is parsed. If AFFINE flag is equal to 1, that is AFFINE mode, But, if not 1, skip/merge index is parsed for VTM's skip/merge mode.

Additional line buffer due to UMVE candidates is not needed. Because a skip/merge candidate of software is directly used as a base candidate. Using input UMVE index, the supplement of MV is decided right before motion compensation. There is no need to hold long line buffer for this.

In current common test condition, either the first or the second merge candidate in the merge candidate list could be selected as the base candidate.

UMVE is also known as Merge with MV Differences (MMVD).

2.2.3.4 Combined Intra-Inter Prediction (CIIP)

Multi-hypothesis prediction is proposed, wherein combined intra and inter prediction is one way to generate multiple hypotheses.

When the multi-hypothesis prediction is applied to improve intra mode, multi-hypothesis prediction combines one intra prediction and one merge indexed prediction. In a merge CU, one flag is signaled for merge mode to select an intra mode from an intra candidate list when the flag is true. For luma component, the intra candidate list is derived from only one intra prediction mode, i.e., planar mode. The weights applied to the prediction block from intra and inter prediction are determined by the coded mode (intra or non-intra) of two neighboring blocks (A1 and B1).

2.2.4 MERGE for Sub-Block-Based Technologies

It is suggested that all the sub-block related motion candidates are put in a separate merge list in addition to the regular merge list for non-sub block merge candidates.

The sub-block related motion candidates are put in a separate merge list is named as 'sub-block merge candidate list'.

In one example, the sub-block merge candidate list includes ATMVP candidate and affine merge candidates.

The sub-block merge candidate list is filled with candidates in the following order:
 a. ATMVP candidate (maybe available or unavailable);
 b. Affine merge lists (including Inherited Affine candidates; and Constructed Affine candidates)
 c. Padding as zero MV 4-parameter affine model 2.2.4.1.1 ATMVP (Aka Sub-Block Temporal Motion Vector Predictor, SbTMVP)

Basic idea of ATMVP is to derive multiple sets of temporal motion vector predictors for one block. Each sub-block is assigned with one set of motion information. When an ATMVP merge candidate is generated, the motion compensation is done in 8×8 level instead of the whole block level.

2.2.5 Regular Inter Mode (AMVP)

2.2.5.1 AMVP Motion Candidate List

Similar to the AMVP design in HEVC, up to 2 AMVP candidates may be derived. However, the HMVP candidates may also be added after the TMVP candidate. The HMVP candidates in the HMVP table are traversed in an ascending order of index (i.e., from index equal to 0, the oldest one). Up to 4 HMVP candidates may be checked to find whether its reference picture is the same as the target reference picture (i.e., same POC value).

2.2.5.2 AMVR

In HEVC, motion vector differences (MVDs) (between the motion vector and predicted motion vector of a PU) are signalled in units of quarter luma samples when use_integer_mv_flag is equal to 0 in the slice header. In the VVC, a locally adaptive motion vector resolution (AMVR) is introduced. In the VVC, MVD can be coded in units of quarter luma samples, integer luma samples or four luma samples (i.e., ¼-pel, 1-pel, 4-pel). The MVD resolution is controlled at the coding unit (CU) level, and MVD resolution flags are conditionally signalled for each CU that has at least one non-zero MVD components.

For a CU that has at least one non-zero MVD components, a first flag is signalled to indicate whether quarter luma sample MV precision is used in the CU. When the first flag (equal to 1) indicates that quarter luma sample MV precision is not used, another flag is signalled to indicate whether integer luma sample MV precision or four luma sample MV precision is used.

When the first MVD resolution flag of a CU is zero, or not coded for a CU (meaning all MVDs in the CU are zero), the quarter luma sample MV resolution is used for the CU. When a CU uses integer-luma sample MV precision or four-luma-sample MV precision, the MVPs in the AMVP candidate list for the CU are rounded to the corresponding precision.

2.2.5.3 Symmetric Motion Vector Difference

Symmetric motion vector difference (SMVD) is applied for motion information coding in bi-prediction.

Firstly, in slice level, variables RefIdxSymL0 and RefIdxSymL1 to indicate the reference picture index of list 0/1 used in SMVD mode, respectively, are derived with the following steps as specified in N1001-v2. When at least one of the two variables are equal to −1, SMVD mode shall be disabled.

2.2.6 Refinement of Motion Information 2.2.6.1 Decoder-Side Motion Vector Refinement (DMVR)

In bi-prediction operation, for the prediction of one block region, two prediction blocks, formed using a motion vector (MV) of list0 and a MV of list1, respectively, are combined to form a single prediction signal. In the decoder-side motion vector refinement (DMVR) method, the two motion vectors of the bi-prediction are further refined.

Figure 17:
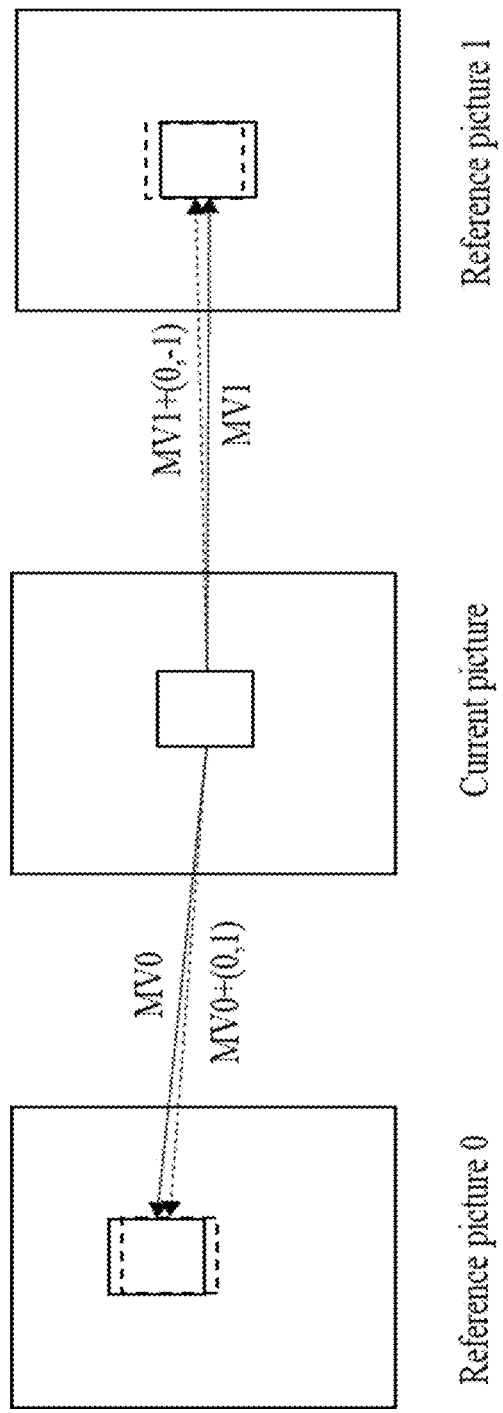
FIG. 17 shows an example of MVD (0, 1) mirrored between list 0 and list 1 in DMVR.

For DMVR in VVC, MVD mirroring between list 0 and list 1 is assumed as shown in FIG. 17, and bilateral matching is performed to refine the MVs, i.e., to find the best MVD among several MVD candidates. Denote the MVs for two reference picture lists by MVL0(L0X, L0Y), and MVL1 (L1X, L1Y). The MVD denoted by (MvdX, MvdY) for list 0 that could minimize the cost function (e.g., SAD) is defined as the best MVD. For the SAD function, it is defined as the SAD between the reference block of list 0 derived with a motion vector (L0X+MvdX, L0Y+MvdY) in the list 0 reference picture and the reference block of list 1 derived with a motion vector (L1X−MvdX, L1Y−MvdY) in 1 the list reference picture.

Figure 18:
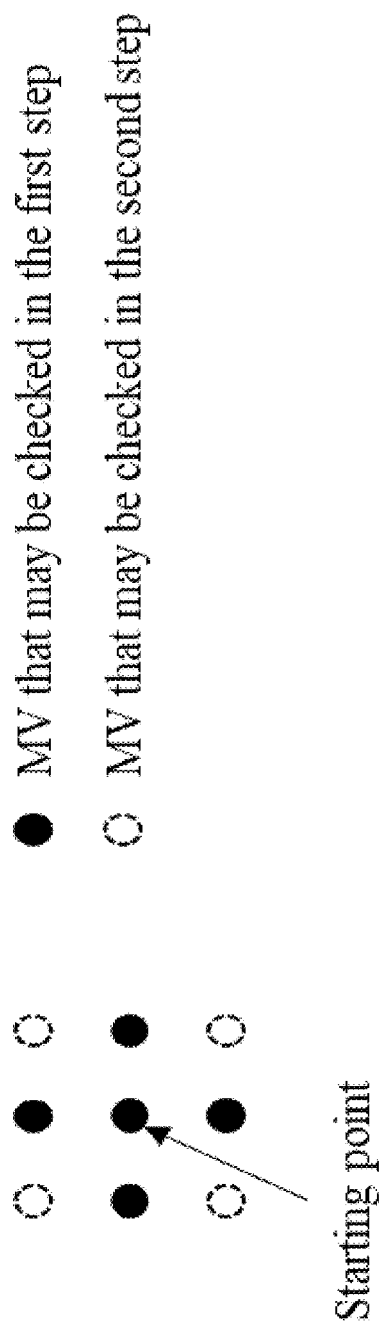
FIG. 18 shows MVs that may be checked in one iteration
Figure 19:
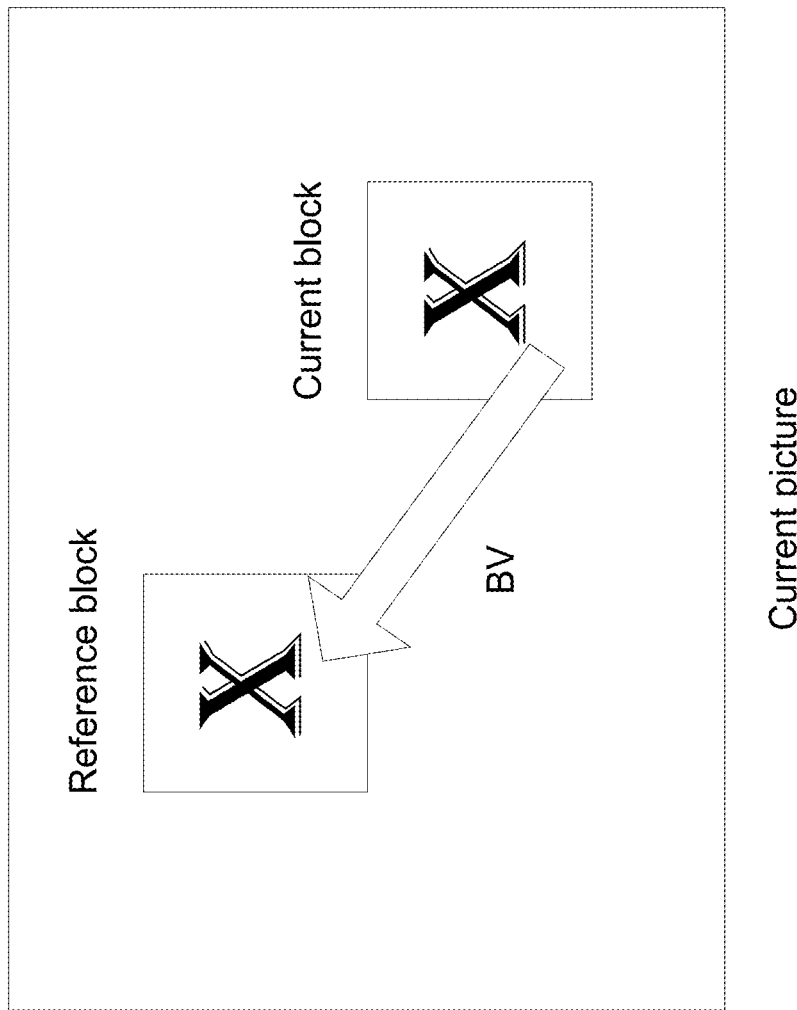
FIG. 19 is an illustration an intra block copy (IBC) mode.

The motion vector refinement process may iterate twice. In each iteration, at most 6 MVDs (with integer-pel precision) may be checked in two steps, as shown in FIG. 18, the first step, MVD (0, 0), (−1, 0), (1, 0), (0, −1), (0, 1) are checked. In the second step, one of the MVD (−1, −1), (−1, 1), (1, −1) or (1, 1) may be selected and further checked. Suppose function Sad(x, y) returns SAD value of the MVD (x, y). The MVD, denoted by (MvdX, MvdY), checked in the second step is decided as follows:

```
MvdX = −1;
MvdY = −1;
If (Sad(1, 0) < Sad(−1, 0))
    MvdX = 1;
If (Sad(0, 1) < Sad(0, −1))
    MvdY = 1;
```

In the first iteration, the starting point is the signaled MV, and in the second iteration, the starting point is the signaled MV plus the selected best MVD in the first iteration. DMVR applies only when one reference picture is a preceding picture and the other reference picture is a following picture, and the two reference pictures are with same picture order count distance from the current picture.

To further simplify the process of DMVR, it proposed several changes to the design in JEM. More specifically, the adopted DMVR design to VTM-4.0 (to be released soon) has the following main features:

Early termination when (0,0) position SAD between list0 and list1 is smaller than a threshold.

Early termination when SAD between list0 and list1 is zero for some position.

Block sizes for DMVR: W*H>=64 && H>=8, wherein W and H are the width and height of the block.

Split the CU into multiple of 16×16 sub-blocks for DMVR of CU size>16*16. If only width or height of the CU is larger than 16, it is only split in vertical or horizontal direction.

Reference block size (W+7)*(H+7) (for luma).

25 points SAD-based integer-pel search (i.e. (+−) 2 refinement search range, single stage)

Bilinear-interpolation based DMVR.

"Parametric error surface equation" based sub-pel refinement. This procedure is performed only when the minimum SAD cost is not equal to zero and the best MVD is (0, 0) in the last MV refinement iteration.

Luma/chroma MC w/reference block padding (if needed).

Refined MVs used for MC and TMVPs only.

2.2.6.1.1 Usage of DMVR

When the following conditions are all true, DMVR may be enabled:

DMVR enabling flag in the SPS (i.e., sps_dmvr_enabled_flag) is equal to 1

TPM flag, inter-affine flag and subblock merge flag (either ATMVP or affine merge), MMVD flag are all equal to 0

Merge flag is equal to 1

Current block is bi-predicted, and POC distance between current picture and reference picture in list 1 is equal to the POC distance between reference picture in list 0 and current picture The current CU height is greater than or equal to 8

Number of luma samples (CU width*height) is greater than or equal to 64

2.2.6.1.2 "Parametric Error Surface Equation" Based Sub-Pel Refinement

The method is summarized below:

1. The parametric error surface fit is computed only if the center position is the best cost position in a given iteration.

2. The center position cost and the costs at (−1,0), (0,−1), (1,0) and (0,1) positions from the center are used to fit a 2-D parabolic error surface equation of the form $$E(x,y)=A(x-x_0)^2+B(y-y_0)^2+C$$

where ($x_0$, $y_0$) corresponds to the position with the least cost and C corresponds to the minimum cost value.

By solving the 5 equations in 5 unknowns, $(x_0, y_0)$ is computed as:

$$x_0 = (E(-1,0) - E(1,0))/(2(E(-1,0) + E(1,0) - 2E(0,0)))$$

$$y_0 = (E(0,-1) - E(0,1))/(2((E(0,-1) + E(0,1) - 2E(0,0)))$$

$(x_0, y_0)$ can be computed to any required sub-pixel precision by adjusting the precision at which the division is performed (i.e. how many bits of quotient are computed). For $1/16^{th}$-pel accuracy, just 4-bits in the absolute value of the quotient needs to be computed, which lends itself to a fast-shifted subtraction-based implementation of the 2 divisions required per CU.

3. The computed $(x_0, y_0)$ are added to the integer distance refinement MV to get the sub-pixel accurate refinement delta MV.

2.2.6.2 Bi-Directional Optical Flow (BDOF)

2.3 Intra Block Copy

Intra block copy (IBC), a.k.a. current picture referencing, has been adopted in HEVC Screen Content Coding extensions (HEVC-SCC) and the current VVC test model (VTM-4.0). IBC extends the concept of motion compensation from inter-frame coding to intra-frame coding. As demonstrated in FIG. 18, the current block is predicted by a reference block in the same picture when IBC is applied. The samples in the reference block must have been already reconstructed before the current block is coded or decoded. Although IBC is not so efficient for most camera-captured sequences, it shows significant coding gains for screen content. The reason is that there are lots of repeating patterns, such as icons and text characters in a screen content picture. IBC can remove the redundancy between these repeating patterns effectively. In HEVC-SCC, an inter-coded coding unit (CU) can apply IBC if it chooses the current picture as its reference picture. The MV is renamed as block vector (BV) in this case, and a BV always has an integer-pixel precision. To be compatible with main profile HEVC, the current picture is marked as a "long-term" reference picture in the Decoded Picture Buffer (DPB). It should be noted that similarly, in multiple view/3D video coding standards, the inter-view reference picture is also marked as a "long-term" reference picture.

Following a BV to find its reference block, the prediction can be generated by copying the reference block. The residual can be got by subtracting the reference pixels from the original signals. Then transform and quantization can be applied as in other coding modes.

However, when a reference block is outside of the picture, or overlaps with the current block, or outside of the reconstructed area, or outside of the valid area restricted by some constrains, part or all pixel values are not defined. Basically, there are two solutions to handle such a problem. One is to disallow such a situation, e.g. in bitstream conformance. The other is to apply padding for those undefined pixel values. The following sub-sessions describe the solutions in detail.

2.3.1 IBC in VVC Test Model (VTM4.0)

In the current VVC test model, i.e. VTM-4.0 design, the whole reference block should be with the current coding tree unit (CTU) and does not overlap with the current block. Thus, there is no need to pad the reference or prediction block. The IBC flag is coded as a prediction mode of the current CU. Thus, there are totally three prediction modes, MODE_INTRA, MODE_INTER and MODE_IBC for each CU.

2.3.1.1 IBC Merge Mode

In IBC merge mode, an index pointing to an entry in the IBC merge candidates list is parsed from the bitstream. The construction of the IBC merge list can be summarized according to the following sequence of steps:

Step 1: Derivation of spatial candidates
Step 2: Insertion of HMVP candidates
Step 3: Insertion of pairwise average candidates In the derivation of spatial merge candidates, a maximum of four merge candidates are selected among candidates located in the positions depicted in $A_1$, $B_1$, $B_0$, $A_0$ and $B_2$ as depicted in FIG. 2. The order of derivation is $A_1$, $B_1$, $B_0$, $A_0$ and $B_2$. Position $B_2$ is considered only when any PU of position $A_1$, $B_1$, $B_0$, $A_0$ is not available (e.g. because it belongs to another slice or tile) or is not coded with IBC mode. After candidate at position $A_1$ is added, the insertion of the remaining candidates is subject to a redundancy check which ensures that candidates with same motion information are excluded from the list so that coding efficiency is improved.

After insertion of the spatial candidates, if the IBC merge list size is still smaller than the maximum IBC merge list size, IBC candidates from HMVP table may be inserted. Redundancy check are performed when inserting the HMVP candidates.

Finally, pairwise average candidates are inserted into the IBC merge list.

When a reference block identified by a merge candidate is outside of the picture, or overlaps with the current block, or outside of the reconstructed area, or outside of the valid area restricted by some constrains, the merge candidate is called invalid merge candidate.

It is noted that invalid merge candidates may be inserted into the IBC merge list.

2.3.1.2 IBC AMVP Mode

In IBC AMVP mode, an AMVP index point to an entry in the IBC AMVP list is parsed from the bitstream. The construction of the IBC AMVP list can be summarized according to the following sequence of steps:

Step 1: Derivation of spatial candidates
   Check $A_0$, $A_1$ until an available candidate is found.
   Check $B_0$, $B_1$, $B_2$ until an available candidate is found.
Step 2: Insertion of HMVP candidates
Step 3: Insertion of zero candidates After insertion of the spatial candidates, if the IBC AMVP list size is still smaller than the maximum IBC AMVP list size, IBC candidates from HMVP table may be inserted.

Finally, zero candidates are inserted into the IBC AMVP list.

2.3.1.3 Chroma IBC Mode

In the current VVC, the motion compensation in the chroma IBC mode is performed at sub block level. The chroma block will be partitioned into several sub blocks. Each sub block determines whether the corresponding luma block has a block vector and the validity if it is present. There is encoder constrain in the current VTM, where the chroma IBC mode will be tested if all sub blocks in the current chroma CU have valid luma block vectors. For example, on a YUV 420 video, the chroma block is N×M and then the collocated luma region is 2N×2M. The sub block size of a chroma block is 2×2. There are several steps to perform the chroma mv derivation then the block copy process.

1) The chroma block will be first partitioned into $(N>>1)*(M>>1)$ sub blocks.
2) Each sub block with a top left sample coordinated at (x, y) fetches the corresponding luma block covering the same top-left sample which is coordinated at (2x, 2y).

3) The encoder checks the block vector(bv) of the fetched luma block. If one of the following conditions is satisfied, the bv is considered as invalid.
   a. A bv of the corresponding luma block is not existing.
   b. The prediction block identified by a bv is not reconstructed yet.
   c. The prediction block identified by a bv is partially or fully overlapped with the current block.
4) The chroma motion vector of a sub block is set to the motion vector of the corresponding luma sub block.

The IBC mode is allowed at the encoder when all sub blocks find a valid bv.

The decoding process of an IBC block is listed below. The part related to chroma mv derivation in a IBC mode is italicized.

8.6.1 General Decoding Process for Coding Units Coded in IBC Prediction

Inputs to this process are:
a luma location (xCb, yCb) specifying the top-left sample of the current coding block relative to the top-left luma sample of the current picture,
a variable cbWidth specifying the width of the current coding block in luma samples,
a variable cbHeight specifying the height of the current coding block in luma samples,
a variable treeType specifying whether a single or a dual tree is used and if a dual tree is used, it specifies whether the current tree corresponds to the luma or chroma components.

Output of this process is a modified reconstructed picture before in-loop filtering.

The derivation process for quantization parameters as specified in clause 8.7.1 is invoked with the luma location (xCb, yCb), the width of the current coding block in luma samples cbWidth and the height of the current coding block in luma samples cbHeight, and the variable tree Type as inputs.

The decoding process for coding units coded in ibc prediction mode consists of the following ordered steps:
1. The motion vector components of the current coding unit are derived as follows:
   1. If treeType is equal to SINGLE_TREE or DUAL_TREE_LUMA, the following applies:
      The derivation process for motion vector components as specified in clause 8.6.2.1 is invoked with the luma coding block location (xCb, yCb), the luma coding block width cbWidth and the luma coding block height cbHeight as inputs, and the luma motion vector mvL[0][0] as output.
      When treeType is equal to SINGLE_TREE, the derivation process for chroma motion vectors in clause 8.6.2.9 is invoked with luma motion vector mvL[0][0] as input, and chroma motion vector mvC[0][0] as output.
      The number of luma coding subblocks in horizontal direction numSbX and in vertical direction numSbY are both set equal to 1.
   1. Otherwise, if treeType is equal to DUAL_TREE_CHROMA, the following applies:
      The number of luma coding subblocks in horizontal direction numSbX and in vertical direction numSbY are derived as follows:

numSb$X$=(cbWidth>>2)  (8-886)

numSb$Y$=(cbHeight>>2)  (8-887)

The chroma motion vectors mvC[xSbIdx][ySbIdx] are derived as follows for xSbIdx=0 . . . numSbX−1, ySbIdx=0 . . . numSbY−1;
The luma motion vector mvL[xSbIdx]/[ySbIdx] is derived as follows:
The location (xCuY, yCuY) of the collocated luma coding unit is derived as follows:

xCu$Y$=xCb+xSbId$x$*4  (8-888)

yCu$Y$=yCb+ySbId$x$*4  (8-889)

If CuPredMode[xCuY][yCuY] is equal to MODE_INTRA, the following applies.

mv$L$[xSbId$x$]/[ySbId$x$][0]=0  (8-890)

mv$L$[xSbId$x$][ySbId$x$][1]=0  (8-891)

predFlag$L$0[xSbId$x$][ySbId$x$]=0  (8-892)

predFlag$L$1[xSbId$x$][ySbId$x$]=0  (8-893)

Otherwise (CuPredMode[xCuY][yCuY] is equal to MODE_IBC), the following applies:

mv$L$[xSbId$x$][ySbId$x$][0]=Mv$L$0[xCu$Y$][yCu$Y$][0]  (8-894)

mv$L$[xSbId$x$][ySbId$x$][1]=Mv$L$0[xCu$Y$][yCu$Y$][1]  (8-895)

predFlag$L$0[xSbId$x$][ySbId$x$]=1  (8-896)

predFlag$L$1[xSbId$x$][ySbId$x$]=0  (8-897)

The derivation process for chroma motion vectors in clause 8.6.2.9 is invoked with mvL[xSbIdx][ySbIdx] as inputs, and mvC[xSbIdx][ySbIdx] as output.

It is a requirement of bitstream conformance that the chroma motion vector mvC[xSbIdx][yS-bIdx] shall obey the following constraints:
When the derivation process for block availability as specified in clause 6.4.X [Ed. (BB): Neighbouring blocks availability checking process tbd] is invoked with the current chroma location (xCurr, yCurr) set equal to (xCb/Sub-WidthC, yCb/SubHeightC) and the neighbouring chroma location (xCb/SubWidthC+(mvC[xSbIdx][ySbIdx][0]>>5), yCb/SubHeightC+(mvC[xSbIdx][ySbIdx][1]>>5)) as inputs, the output shall be equal to TRUE.
When the derivation process for block availability as specified in clause 6.4.X [Ed. (BB): Neighbouring blocks availability checking process tbd] is invoked with the current chroma location (xCurr, yCurr) set equal to (xCb/Sub-WidthC, yCb/SubHeightC) and the neighbouring chroma location (xCb/SubWidthC+(mvC[xSbIdx][ySbIdx][0]>>5)+cbWidth/SubWidthC−1, yCb/SubHeightC+(mvC[xSbIdx][ySbIdx][1]>>5)+cbHeight/SubHeightC−1) as inputs, the output shall be equal to TRUE.
One or both of the following conditions shall be true:
(mvC[xSbIdx][ySbIdx][0]>>5)+xSbIdx*2+2 is less than or equal to 0.
(mvC[xSbIdx][ySbIdx][1]>>5)+ySbIdx*2+2 is less than or equal to 0.

2. The prediction samples of the current coding unit are derived as follows:
   If treeType is equal to SINGLE_TREE or DUAL_TREE_LUMA, the prediction samples of the current coding unit are derived as follows:
     The decoding process for ibc blocks as specified in clause 8.6.3.1 is invoked with the luma coding block location (xCb, yCb), the luma coding block width cbWidth and the luma coding block height cbHeight, the number of luma coding subblocks in horizontal direction numSbX and in vertical direction numSbY, the luma motion vectors mvL[xSbIdx][ySbIdx] with xSbIdx=0 . . . numSbX−1, and ySbIdx=0 . . . numSbY−1, the variable cIdx set equal to 0 as inputs, and the ibc prediction samples (predSamples) that are an (cbWidth)×(cbHeight) array predSamples of prediction luma samples as outputs.
   Otherwise if tree Type is equal to SINGLE_TREE or DUAL_TREE_CHROMA, the prediction samples of the current coding unit are derived as follows:
     The decoding process ibc blocks as specified in clause 8.6.3.1 is invoked with the luma coding block location (xCb, yCb), the luma coding block width cbWidth and the luma coding block height cbHeight, the number of luma coding subblocks in horizontal direction numSbX and in vertical direction numSbY, the chroma motion vectors mvC[xSbIdx][ySbIdx] with xSbIdx=0 . . . numSbX−1, and ySbIdx=0 . . . numSbY−1 and the variable cIdx set equal to 1 as inputs, and the ibc prediction samples (predSamples) that are an (cbWidth/2)×(cbHeight/2) array $predSamples_{Cb}$ of prediction chroma samples for the chroma components Cb as outputs.
     The decoding process for ibc blocks as specified in clause 8.6.3.1 is invoked with the luma coding block location (xCb, yCb), the luma coding block width cbWidth and the luma coding block height cbHeight, the number of luma coding subblocks in horizontal direction numSbX and in vertical direction numSbY, the chroma vectors mvC[xSbIdx][ySbIdx] motion with xSbIdx=0 . . . numSbX−1, and ySbIdx=0 . . . numSbY−1 and the variable cIdx set equal to 2 as inputs, and the ibc prediction samples (predSamples) that are an (cbWidth/2)×(cbHeight/2) array $predSamples_{Cr}$ of prediction chroma samples for the chroma components Cr as outputs.
3. The variables NumSbX [xCb][yCb] and NumSbY [xCb][yCb] are set equal to numSbX and numSbY, respectively.
4. The residual samples of the current coding unit are derived as follows:
   When tree Type is equal to SINGLE_TREE or treeType is equal to DUAL_TREE_LUMA, the decoding process for the residual signal of coding blocks coded in inter prediction mode as specified in clause 8.5.8 is invoked with the location (xTb0, yTb0) set equal to the luma location (xCb, yCb), the width nTbW set equal to the luma coding block width cbWidth, the height nTbH set equal to the luma coding block height cbHeight and the variable cIdxset equal to 0 as inputs, and the array resSamplest as output.
   When treeType is equal to SINGLE_TREE or treeType is equal to DUAL_TREE_CHROMA, the decoding process for the residual signal of coding blocks coded in inter prediction mode as specified in clause 8.5.8 is invoked with the location (xTb0, yTb0) set equal to the chroma location (xCb/2, yCb/2), the width nTbW set equal to the chroma coding block width cbWidth/2, the height nTbH set equal to the chroma coding block height cbHeight/2 and the variable cIdxset equal to 1 as inputs, and the array $resSamples_{Cb}$ as output.
   When tree Type is equal to SINGLE_TREE or treeType is equal to DUAL_TREE_CHROMA, the decoding process for the residual signal of coding blocks coded in inter prediction mode as specified in clause 8.5.8 is invoked with the location (xTb0, yTb0) set equal to the chroma location (xCb/2, yCb/2), the width nTbW set equal to the chroma coding block width cbWidth/2, the height nTbH set equal to the chroma coding block height cbHeight/2 and the variable cIdxset equal to 2 as inputs, and the array $resSamples_{Cr}$ as output.
5. The reconstructed samples of the current coding unit are derived as follows:
   When tree Type is equal to SINGLE_TREE or treeType is equal to DUAL_TREE_LUMA, the picture reconstruction process for a colour component as specified in clause 8.7.5 is invoked with the block location (xB, yB) set equal to (xCb, yCb), the block width bWidth set equal to cbWidth, the block height bHeight set equal to cbHeight, the variable cIdx set equal to 0, the (cbWidth)×(cbHeight) array predSamples set equal to predSamples, and the (cbWidth)×(cbHeight) array resSamples set equal to resSamples as inputs, and the output is a modified reconstructed picture before in-loop filtering.
   When treeType is equal to SINGLE_TREE or treeType is equal to DUAL_TREE_CHROMA, the picture reconstruction process for a colour component as specified in clause 8.7.5 is invoked with the block location (xB, yB) set equal to (xCb/2, yCb/2), the block width bWidth set equal to cbWidth/2, the block height bHeight set equal to cbHeight/2, the variable cIdx set equal to 1, the (cbWidth/2)×(cbHeight/2) array predSamples set equal to $predSamples_{Cb}$ and the (cbWidth/2)×(cbHeight/2) array resSamples set equal to $resSamples_{Cb}$ as inputs, and the output is a modified reconstructed picture before in-loop filtering.
   When treeType is equal to SINGLE_TREE or treeType is equal to DUAL_TREE_CHROMA, the picture reconstruction process for a colour component as specified in clause 8.7.5 is invoked with the block location (xB, yB) set equal to (xCb/2, yCb/2), the block width bWidth set equal to cbWidth/2, the block height bHeight set equal to cbHeight/2, the variable cIdx set equal to 2, the (cbWidth/2)×(cbHeight/2) array predSamples set equal to $predSamples_{Cr}$ and the (cbWidth/2)×(cbHeight/2) array resSamples set equal to $resSamples_{Cr}$ as inputs, and the output is a modified reconstructed picture before in-loop filtering.

2.3.2 Recent Progress for IBC (in VTM5.0)

2.3.2.1 Single BV List

The BV predictors for merge mode and AMVP mode in IBC will share a common predictor list, which consist of the following elements:

2 spatial neighboring positions (A1, B1 as in FIG. 2)
5 HMVP entries
Zero vectors by default The number of candidates in the list is controlled by a variable derived from the slice header. For merge mode, up to first 6 entries of this list will be used; for AMVP mode, the first 2 entries of this list will be used. And the list conforms with the shared merge list region requirement (shared the same list within the SMR).

In addition to the above-mentioned BV predictor candidate list, it also proposed to simplify the pruning operations between HMVP candidates and the existing merge candidates (A1, B1). In the simplification there will be up to 2 pruning operations since it only compares the first HMVP candidate with spatial merge candidate(s).

2.3.2.1.1 Decoding Process
8.6.2.2 Derivation Process for IBC Luma Motion Vector Prediction This process is only invoked when CuPredMode[xCb][yCb] is equal to MODE_IBC, where (xCb, yCb) specify the top-left sample of the current luma coding block relative to the top-left luma sample of the current picture.

Inputs to this process are:
a luma location (xCb, yCb) of the top-left sample of the current luma coding block relative to the top-left luma sample of the current picture,
a variable cbWidth specifying the width of the current coding block in luma samples,
a variable cbHeight specifying the height of the current coding block in luma samples.

Outputs of this process are:
the luma motion vectors in 1/16 fractional-sample accuracy mvL.

The variables xSmr, ySmr, smrWidth, smrHeight, and smrNumHmvpIbcCand are derived as follows:

$$xSmr=IsInSmr[xCb][yCb]?SmrX[xCb][yCb]:xCb \quad (8\text{-}910)$$

$$ySmr=IsInSmr[xCb][yCb]?SmrY[xCb][yCb]:yCb \quad (8\text{-}911)$$

$$smrWidth=IsInSmr[xCb][yCb]?SmrW[xCb][yCb]:cbWidth \quad (8\text{-}912)$$

$$smrHeight=IsInSmr[xCb][yCb]?SmrH[xCb][yCb]:cbHeight \quad (8\text{-}913)$$

$$smrNumHmvpIbcCand=IsInSmr[xCb][yCb]?NumHmvpSmrIbcCand:NumHmvpIbcCand \quad (8\text{-}914)$$

The luma motion vector mvL is derived by the following ordered steps:

1. The derivation process for spatial motion vector candidates from neighbouring coding units as specified in clause 8.6.2.3 is invoked with the luma coding block location (xCb, yCb) set equal to (xSmr, ySmr), the luma coding block width cbWidth, and the luma coding block height cbHeight set equal to smrWidth and smrHeight as inputs, and the outputs being the availability flags availableFlag$A_1$, availableFlag$B_1$ and the motion vectors mv$A_1$ and mv$B_1$.

2. The motion vector candidate list, mvCandList, is constructed as follows:

$i=0$ if(availableFlag$A_1$)

mvCandList[$i$++]=mv$A_1$ if(availableFlag$B_1$)

mvCandList[$i$++]=mv$B_1$ \quad (8-915)

3. The variable numCurrCand is set equal to the number of merging candidates in the mvCandList.

4. When numCurrCand is less than MaxNumMergeCand and smrNumHmvpIbcCand is greater than 0, the derivation process of IBC history-based motion vector candidates as specified in 8.6.2.4 is invoked with mvCandList, isInSmr set equal to IsInSmr[xCb][yCb], and numCurrCand as inputs, and modified mvCandList and numCurrCand as outputs.

5. When numCurrCand is less than MaxNumMergeCand, the following applies until numCurrCand is equal to MaxNumMergeCand:
   1. mvCandList[numCurrCand][0] is set equal to 0.
   2. mvCandList[numCurrCand][1] is set equal to 0.
   3. numCurrCand is increased by 1.

6. The variable mvIdx is derived as follows:

$$mvIdx=general\_merge\_flag[xCb][yCb]?merge\_idx[xCb][yCb]:mvp\_l0\_flag[xCb][yCb] \quad (8\text{-}916)$$

7. The following assignments are made:

$$mvL[0]=mergeCandList[mvIdx][0] \quad (8\text{-}917)$$

$$mvL[1]=mergeCandList[mvIdx][1] \quad (8\text{-}918)$$

2.3.2.2 Size Restriction of IBC

In the latest VVC and VTM5, it is proposed to explicitly use syntax constraint for disabling 128×128 IBC mode on top of the current bitstream constraint in the previous VTM and VVC versions, which makes presence of IBC flag dependent on CU size<128×128.

2.3.2.3 Shared Merge List for IBC

To reduce the decoder complexity and support parallel encoding, it proposed to share the same merging candidate list for all leaf coding units (CUs) of one ancestor node in the CU split tree for enabling parallel processing of small skip/merge-coded CUs. The ancestor node is named merge sharing node. The shared merging candidate list is generated at the merge sharing node pretending the merge sharing node is a leaf CU.

More specifically, the following may apply:
If the block has luma samples no larger than 32, and split to 2 4×4 child blocks, sharing merge lists between very small blocks (e.g. two adjacent 4×4 blocks) is used.
If the block has luma samples larger than 32, however, after a split, at least one child block is smaller than the threshold (32), all child blocks of that split share the same merge list (e.g. 16×4 or 4×16 split ternary or 8×8 with quad split).

Such a restriction is only applied to IBC merge mode.

2.4 Syntax Tables and Semantics for Coding Unit and Merge Mode 7.3.5.1 General Slice Header Syntax

| | Descriptor |
|---|---|
| slice_header( ) { | |
|   slice_pic_parameter_set_id | ue(v) |
|   if( rect_slice_flag \|\| NumBricksInPic > 1 ) | |
|     slice_address | u(v) |
|   if( !rect_slice_flag && !single_brick_per_slice_flag ) | |
|     num_bricks_in_slice_minus1 | ue(v) |
|   slice_type | ue(v) |
|   ... | |
|   if ( slice_type != I ) { | |
|     if( sps_temporal_mvp_enabled_flag ) | |
|       slice_temporal_mvp_enabled_flag | u(1) |
|     if( slice_type == B ) | |

-continued

| | Descriptor |
|---|---|
| mvd_l1_zero_flag | u(1) |
| if( cabac_init present_flag ) | |
|   cabac_init_flag | u(1) |
| if( slice_temporal_mvp_enabled_flag ) { | |
|   if( slice_type == B ) | |
|     collocated_from_l0_flag | u(1) |
| } | |
| if( ( weighted_pred_flag && slice_type == P ) \|\| | |
|   ( weighted_bipred_flag && slice_type == B ) ) | |
|   pred_weight_table( ) | |
| six minus max num merge cand | ue(v) |
| if( sps_affine_enabled_flag ) | |
|   five_minus_max_num_subblock_merge_cand | ue(v) |
| if( sps_fpel_mmvd_enabled_flag ) | |
|   slice_fpel_mmvd_enabled_flag | u(1) |
| if( sps_triangle_enabled_flag && | |

-continued

| | Descriptor |
|---|---|
|   MaxNumMergeCand >= 2 ) | |
|     max_num_merge_cand_minus_max_num_triangle_cand | ue(v) |
| } else if ( sps_ibc_enabled_flag ) | |
|   six minus max num merge cand | ue(v) |
| slice_qp_delta | se(v) |
| if( pps_slice_chroma_qp_offsets_present_flag ) { | |
|   slice_cb_qp_offset | se(v) |
|   slice_cr_qp_offset | se(v) |
| } | |
| ... | |
|   byte_alignment( ) | |
| } | |

7.3.7.5 Coding Unit Syntax

| | Descriptor |
|---|---|
| coding_unit( x0, y0, cbWidth, cbHeight, treeType ) { | |
|   if( slice_type != I \|\| sps_ibc_enabled_flag ) { | |
|     if( treeType != DUAL_TREE_CHROMA && | |
|       !( cbWidth == 4 && cbHeight == 4 && !sps_ibc_enabled_flag ) ) | |
|       cu_skip_flag[ x0 ][ y0 ] | ae(v) |
|     if( cu_skip_flag[ x0 ][ y0 ] == 0 && slice_type != I | |
|       && !( cbWidth == 4 && cbHeight == 4 ) ) | |
|       pred_mode_flag | ae(v) |
|     if( ( ( slice_type == I && cu_skip_flag[ x0 ][ y0 ] ==0 ) \|\| | |
|       ( slice_type != I && ( CuPredMode[ x0 ][ y0 ] != MODE_INTRA \|\| | |
|       ( cbWidth == 4 && cbHeight == 4 && cu_skip_flag[ x0 ][ y0 ] == 0 ) ) ) ) && | |
|       sps_ibc_enabled_flag && ( cbWidth != 128 \|\| cbHeight != 128 ) ) | |
|       pred_mode_ibc_flag | ae(v) |
|   } | |
|   if( CuPredMode[ x0 ][ y0 ] == MODE_INTRA ) { | |
| ... | |
|   } | |
|   } else if( treeType != DUAL_TREE_CHROMA ) { /* MODE_INTER or MODE_IBC */ | |
|     if( cu_skip_flag[ x0 ][ y0 ] == 0 ) | |
|       general_merge_flag[ x0 ][ y0 ] | ae(v) |
|     if( general_merge_flag[ x0 ][ y0 ] ) { | |
|       merge_data( x0, y0, cbWidth, cbHeight ) | |
|     } else if ( CuPredMode[ x0 ] [ y0 ] == MODE_IBC ) { | |
|       mvd_coding( x0, y0, 0, 0 ) | |
|       mvp_l0_flag[ x0 ] [ y0 ] | ae(v) |
|       if( sps_amvr_enabled_flag && | |
|         ( MvdL0[ x0 ] [ y0 ] [ 0 ] != 0 \|\| MvdL0[ x0 ] [ y0 ] [ 1 ] != 0 ) ) { | |
|         amvr_precision_flag[ x0 ] [ y0 ] | ae(v) |
|       } | |
|     } else { | |
|       if( slice_type == B ) | |
|         inter_pred_idc[ x0 ][ y0 ] | ae(v) |
|       if( sps_affine_enabled_flag && cbWidth >= 16 && cbHeight >= 16 ) { | |
|         inter_affine_flag[ x0 ][ y0 ] | ae(v) |
|       if( sps_affine_type_flag && inter_affine_flag[ x0 ][ y0 ] ) | |
|         cu_affine_type_flag[ x0 ][ y0 ] | ae(v) |
|       if( sps_smvd_enabled_flag && inter_pred_idc[ x0 ][ y0 ] == PRED_BI && | |
|         !inter_affine_flag[ x0 ][ y0 ] && RefIdxSymL0 > -1 && RefIdxSymL1 > -1 ) | |
|         sym_mvd_flag[ x0 ][ y0 ] | ae(v) |
| ... | |
|     } | |
|   } | |
| } | |

7.3.7.7 Merge Data Syntax

| | Descriptor |
|---|---|
| merge_data( x0, y0, cbWidth, cbHeight ) { | |
|   if ( CuPredMode[ x0 ] [ y0 ] == MODE_IBC ) { | |
|     if( MaxNumMergeCand > 1 ) | |
|       merge_idx[ x0 ] [ y0 ] | ae(v) |
|   } else { | |
|     if( sps_mmvd_enabled_flag \|\| cbWidth * cbHeight != 32 ) | |

|  | Descriptor |
|---|---|
| ```
    regular_merge_flag[ x0 ][ y0 ]
    if ( regular_merge_flag[ x0 ][ y0 ] == 1 ){
      if( MaxNumMergeCand > 1 )
        merge_idx[ x0 ][ y0 ]
    } else {
      if( sps_mmvd_enabled_flag && cbWidth * cbHeight != 32 )
        mmvd_merge_flag[ x0 ][ y0 ]
      if( mmvd_merge_flag[ x0 ][ y0 ] == 1 ) {
        if( MaxNumMergeCand > 1 )
          mmvd_cand_flag[ x0 }[ y0 ]
        mmvd_distance_idx[ x0 }[ y0 ]
        mmvd_direction_idx[ x0 ][ y0 ]
      } else {
        if( MaxNumSubblockMergeCand > 0 && cbWidth >= 8 && chHeight >= 8 )
          merge_subblock_flag[ x0 ][ y0 ]
        if( merge_subblock_flag[ x0 ][ y0 ] == 1 ) {
          if( MaxNumSubblockMergeCand > 1 )
            merge_subblock_idx[ x0 ][ y0 ]
        } else {
          if( sps_ciip_enabled_flag && cu_skip_flag[ x0 ][ y0 ] == 0 &&
            ( cbWidth * cbHeight ) >= 64 && cbWidth < 128 && cbHeight < 128 ) {
            ciip_flag[ x0 ][ y0 ]
          if( ciip_flag[ x0 ][ y0 ] && MaxNumMergeCand > 1 )
            merge_idx[ x0 ][ y0 ]
          }
          if( MergeTriangleFlag[ x0 ][ y0 ] ) {
            merge_triangle_split_dir[ x0 ][ y0 ]
            merge_triangle_idx0[ x0 ][ y0 ]
            merge_triangle_idx1[ x0 ][ y0 ]
          }
        }
      }
    }
  }
}
``` | ae(v)<br>ae(v)<br><br>ae(v)<br><br>ae(v)<br>ae(v)<br>ae(v)<br><br>ae(v)<br><br>ae(v)<br><br><br>ae(v)<br><br>ae(v)<br><br>ae(v)<br>ae(v)<br>ae(v) |

7.4.6.1 General Slice Header Semantics six_minus_max_num_merge_cand specifies the maximum number of merging motion vector prediction (MVP) candidates supported in the slice subtracted from 6. The maximum number of merging MVP candidates, MaxNumMergeCand is derived as follows:

$$\text{MaxNumMergeCand} = 6 - \text{six\_minus\_max\_num\_merge\_cand} \tag{7-57}$$

The value of MaxNumMergeCand shall be in the range of 1 to 6, inclusive.

five_minus_max_num_subblock_merge_cand specifies the maximum number of subblock-based merging motion vector prediction (MVP) candidates supported in the slice subtracted from 5. When five_minus_max_num_subblock_merge_cand is not present, it is inferred to be equal to 5−sps_sbtmvp_enabled_flag. The maximum number of subblock-based merging MVP candidates, MaxNumSubblockMergeCand is derived as follows:

$$\text{MaxNumSubblockMergeCand} = 5 - \text{five\_minus\_max\_num\_subblock\_merge\_cand} \tag{7-58}$$

The value of MaxNumSubblockMergeCand shall be in the range of 0 to 5, inclusive.

7.4.8.5 Coding Unit Semantics pred_mode_flag equal to 0 specifies that the current coding unit is coded in inter prediction mode. pred_mode_flag equal to 1 specifies that the current coding unit is coded in intra prediction mode.

When pred_mode_flag is not present, it is inferred as follows:

If cbWidth is equal to 4 and cbHeight is equal to 4, pred_mode_flag is inferred to be equal to 1.

Otherwise, pred_mode_flag is inferred to be equal to 1 when decoding an I slice, and equal to 0 when decoding a P or B slice, respectively.

The variable CuPredMode[x][y] is derived as follows for x=x0, ... x0+cbWidth−1 and y=y0 ... y0+cbHeight−1:

If pred_mode_flag is equal to 0, CuPredMode[x][y] is set equal to MODE_INTER.

Otherwise (pred_mode_flag is equal to 1), CuPredMode[x][y] is set equal to MODE_INTRA.

pred_mode_ibc_flag equal to 1 specifies that the current coding unit is coded in IBC prediction mode. pred_mode_ibc_flag equal to 0 specifies that the current coding unit is not coded in IBC prediction mode.

When pred_mode_ibc_flag is not present, it is inferred as follows:

If cu_skip_flag[x0][y0] is equal to 1, and cbWidth is equal to 4, and cbHeight is equal to 4, pred_mode_ibc_flag is inferred to be equal 1.

Otherwise, if both cbWidth and cbHeight are equal to 128, pred_mode_ibc_flag is inferred to be equal to 0.

Otherwise, pred_mode_ibc_flag is inferred to be equal to the value of sps_ibc_enabled_flag when decoding an I slice, and 0 when decoding a P or B slice, respectively.

When pred_mode_ibc_flag is equal to 1, the variable CuPredMode[x][y] is set to be equal to MODE_IBC for x=x0 ... x0+cbWidth−1 and y=y0 ... y0+cbHeight−1.

general_merge_flag[x0][y0] specifies whether the inter prediction parameters for the current coding unit are inferred from a neighbouring inter-predicted partition. The array indices x0, y0 specify the location (x0, y0) of the top-left luma sample of the considered coding block relative to the top-left luma sample of the picture.

When general_merge_flag[x0][y0] is not present, it is inferred as follows:

If cu_skip_flag[x0][y0] is equal to 1, general_merge_flag [x0][y0] is inferred to be equal to 1.

Otherwise, general_merge_flag[x0][y0] is inferred to be equal to 0.

mvp_l0_flag[x0][y0] specifies the motion vector predictor index of list 0 where x0, y0 specify the location (x0, y0) of the top-left luma sample of the considered coding block relative to the top-left luma sample of the picture.

When mvp_l0_flag[x0][y0] is not present, it is inferred to be equal to 0.

mvp_l1_flag[x0][y0] has the same semantics as mvp_l0_flag, with l0 and list 0 replaced by l1 and list 1, respectively.

inter_pred_idc[x0][y0] specifies whether list0, list1, or bi-prediction is used for the current coding unit according to Table 7-10. The array indices x0, y0 specify the location (x0, y0) of the top-left luma sample of the considered coding block relative to the top-left luma sample of the picture.

TABLE 7-10

Name association to inter prediction mode

| inter_pred_idc | Name of inter_pred_idc | | |
|---|---|---|---|
| | ( cbWidth + cbHeight ) > 12 | ( cbWidth + cbHeight ) == 12 | ( cbWidth + cbHeight ) == 8 |
| 0 | PRED_L0 | PRED_L0 | n.a. |
| 1 | PRED_L1 | PRED_L1 | n.a. |
| 2 | PRED_BI | n.a. | n.a. |

When inter_pred_idc[x0][y0] is not present, it is inferred to be equal to PRED_L0.

7.4.8.7 Merge Data Semantics regular_merge_flag[x0][y0] equal to 1 specifies that regular merge mode is used to generate the inter prediction parameters of the current coding unit. The array indices x0, y0 specify the location (x0, y0) of the top-left luma sample of the considered coding block relative to the top-left luma sample of the picture.

When regular_merge_flag[x0][y0] is not present, it is inferred as follows:

If all the following conditions are true, regular_merge_flag[x0][y0] is inferred to be equal to 1:
sps_mmvd_enabled_flag is equal to 0.
general_merge_flag[x0][y0] is equal to 1.
cbWidth*cbHeight is equal to 32.

Otherwise, regular_merge_flag[x0][y0] is inferred to be equal to 0.

mmvd_merge_flag[x0][y0] equal to 1 specifies that merge mode with motion vector difference is used to generate the inter prediction parameters of the current coding unit. The array indices x0, y0 specify the location (x0, y0) of the top-left luma sample of the considered coding block relative to the top-left luma sample of the picture.

When mmvd_merge_flag[x0][y0] is not present, it is inferred as follows:

If all the following conditions are true, mmvd_merge_flag[x0][y0] is inferred to be equal to 1:
sps_mmvd_enabled_flag is equal to 1.
general_merge_flag[x0][y0] is equal to 1.
cbWidth*cbHeight is equal to 32.
regular_merge_flag[x0][y0] is equal to 0.

Otherwise, mmvd_merge_flag[x0][y0] is inferred to be equal to 0.

mmvd_cand_flag[x0][y0] specifies whether the first (0) or the second (1) candidate in the merging candidate list is used with the motion vector difference derived from mmvd_distance_idx[x0][y0] and mmvd_direction_idx[x0][y0]. The array indices x0, y0 specify the location (x0, y0) of the top-left luma sample of the considered coding block relative to the top-left luma sample of the picture.

When mmvd_cand_flag[x0][y0] is not present, it is inferred to be equal to 0.

mmvd_distance_idx[x0][y0] specifies the index used to derive MmvdDistance[x0][y0] as specified in Table 7-12. The array indices x0, y0 specify the location (x0, y0) of the top-left luma sample of the considered coding block relative to the top-left luma sample of the picture.

TABLE 7-12

Specification of MmvdDistance[ x0 ][ y0 ] based on mmvd_distance_idx[ x0 ][ y0 ].

| | MmvdDistance[ x0 ][ y0 ] | |
|---|---|---|
| mmvd_distance_idx [ x0 ][ y0 ] | slice_fpel_mmvd_enabled_flag == 0 | slice_fpel_mmvd_enabled_flag == 1 |
| 0 | 1 | 4 |
| 1 | 2 | 8 |
| 2 | 4 | 16 |
| 3 | 8 | 32 |
| 4 | 16 | 64 |
| 5 | 32 | 128 |
| 6 | 64 | 256 |
| 7 | 128 | 512 | mmvd_direction_idx[x0][y0] specifies index used to derive MmvdSign[x0][y0] as specified in Table 7-13. The array indices x0, y0 specify the location (x0, y0) of the top-left luma sample of the considered coding block relative to the top-left luma sample of the picture.

TABLE 7-13

Specification of MmvdSign[ x0 ][ y0 ] based on mmvd_direction_idx[ x0 ][ y0 ]

| mmvd_direction_idx[ x0 ][ y0 ] | MmvdSign[ x0 ][ y0 ][0] | MmvdSign[ x0 ][ y0 ][1] |
|---|---|---|
| 0 | +1 | 0 |
| 1 | −1 | 0 |
| 2 | 0 | +1 |
| 3 | 0 | −1 |

Both components of the merge plus MVD offset MmvdOffset[x0][y0] are derived as follows:

$$MmvdOffset[x0][y0][0]=(MmvdDistance[x0][y0]<<2)*MmvdSign[x0][y0][0] \quad (7\text{-}124)$$

$$MmvdOffset[x0][y0][1]=(MmvdDistance[x0][y0]<<2)*MmvdSign[x0][y0][1] \quad (7\text{-}125)$$

merge_subblock_flag[x0][y0] specifies whether the subblock-based inter prediction parameters for the current coding unit are inferred from neighbouring blocks. The array indices x0, y0 specify the location (x0, y0) of the top-left luma sample of the considered coding block relative to the top-left luma sample of the picture. When merge_subblock_flag[x0][y0] is not present, it is inferred to be equal to 0.

merge_subblock_idx[x0][y0] specifies the merging candidate index of the subblock-based merging candidate list where x0, y0 specify the location (x0, y0) of the top-left luma sample of the considered coding block relative to the top-left luma sample of the picture.

When merge_subblock_idx[x0][y0] is not present, it is inferred to be equal to 0.

ciip_flag[x0][y0] specifies whether the combined inter-picture merge and intra-picture prediction is applied for the current coding unit. The array indices x0, y0 specify the location (x0, y0) of the top-left luma sample of the considered coding block relative to the top-left luma sample of the picture.

When ciip_flag[x0][y0] is not present, it is inferred to be equal to 0.

When ciip_flag[x0][y0] is equal to 1, the variable IntraPredModeY[x][y] with x=xCb . . . xCb+cbWidth−1 and y=yCb . . . yCb+cbHeight−1 is set to be equal to INTRA_PLANAR.

The variable MergeTriangleFlag[x0][y0], which specifies whether triangular shape based motion compensation is used to generate the prediction samples of the current coding unit, when decoding a B slice. is derived as follows:
- If all the following conditions are true, MergeTriangleFlag[x0][y0] is set equal to 1:
  - sps_triangle_enabled_flag is equal to 1.
  - slice_type is equal to B.
  - general_merge_flag[x0][y0] is equal to 1.
  - MaxNumTriangleMergeCand is greater than or equal to 2.
  - cbWidth*cbHeight is greater than or equal to 64.
  - regular_merge_flag[x0][y0] is equal to 0.
  - mmvd_merge_flag[x0][y0] is equal to 0.
  - merge_subblock_flag[x0][y0] is equal to 0.
  - ciip_flag[x0][y0] is equal to 0.
- Otherwise, MergeTriangleFlag[x0][y0] is set equal to 0.

merge_triangle_split_dir[x0][y0] specifies the splitting direction of merge triangle mode. The array indices x0, y0 specify the location (x0, y0) of the top-left luma sample of the considered coding block relative to the top-left luma sample of the picture.

When merge_triangle_split_dir[x0][y0] is not present, it is inferred to be equal to 0.

merge_triangle_idx0[x0][y0] specifies the first merging candidate index of the triangular shape based motion compensation candidate list where x0, y0 specify the location (x0, y0) of the top-left luma sample of the considered coding block relative to the top-left luma sample of the picture.

When merge_triangle_idx0[x0][y0] is not present, it is inferred to be equal to 0.

merge_triangle_idx1[x0][y0] specifies the second merging candidate index of the triangular shape based motion compensation candidate list where x0, y0 specify the location (x0, y0) of the top-left luma sample of the considered coding block relative to the top-left luma sample of the picture.

When merge_triangle_idx[x0][y0] is not present, it is inferred to be equal to 0.

merge_idx[x0][y0] specifies the merging candidate index of the merging candidate list where x0, y0 specify the location (x0, y0) of the top-left luma sample of the considered coding block relative to the top-left luma sample of the picture.

When merge_idx[x0][y0] is not present, it is inferred as follows:
- If mmvd_merge_flag[x0][y0] is equal to 1, merge_idx[x0][y0] is inferred to be equal to mmvd_cand_flag[x0][y0].
- Otherwise (mmvd_merge_flag[x0][y0] is equal to 0), merge_idx[x0][y0] is inferred to be equal to 0.

3 Examples of Technical Problems Solved by Embodiments

The current IBC may have the following problems:
1. IBC is only applicable to square or rectangular coded units. Using similar technology like TPM to IBC coded blocks may bring additional coding gains.

4 Various Techniques and Embodiments

The detailed techniques below should be considered as examples to explain general concepts. These techniques should not be interpreted in a narrow way. Furthermore, these inventions can be combined in any manner.

In this section, intra block copy (IBC) may not be limited to the current IBC technology, but may be interpreted as the technology that using the reference samples within the current slice/tile/brick/picture/other video unit (e.g., CTU row).

Figure 20:
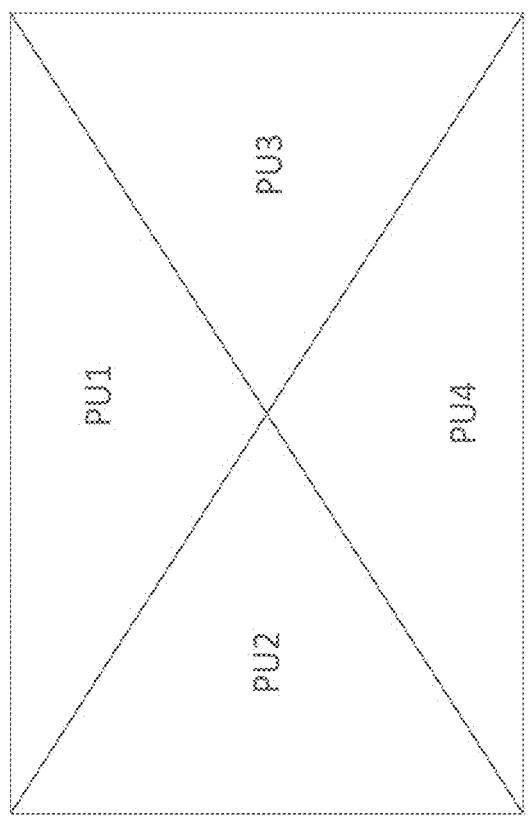
FIG. 20 shows an example of division of a block to four sub-regions.
Figure 21:
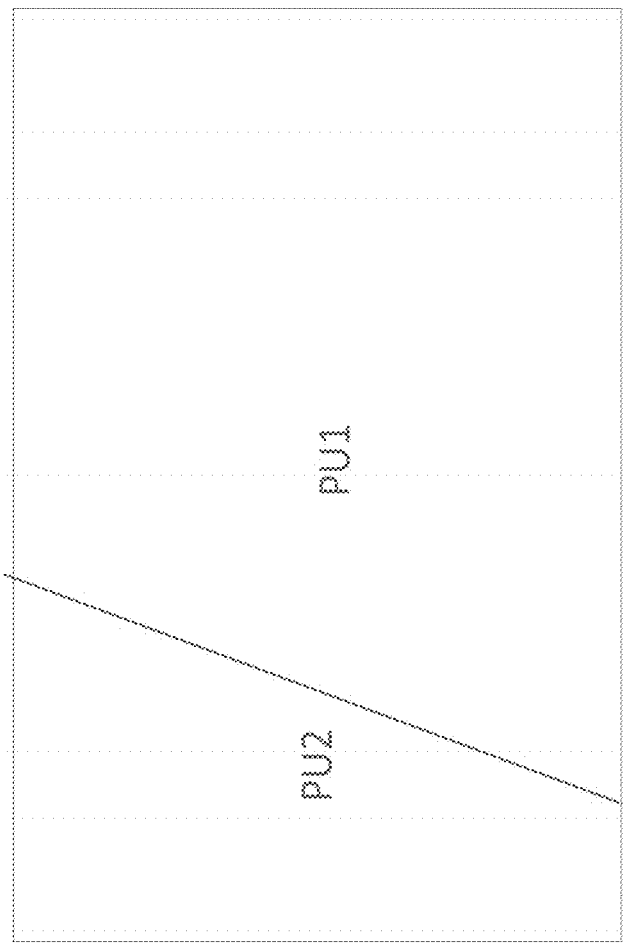
FIG. 21 shows an example of division of a block to two wedgelet sub-regions.
Figure 22:
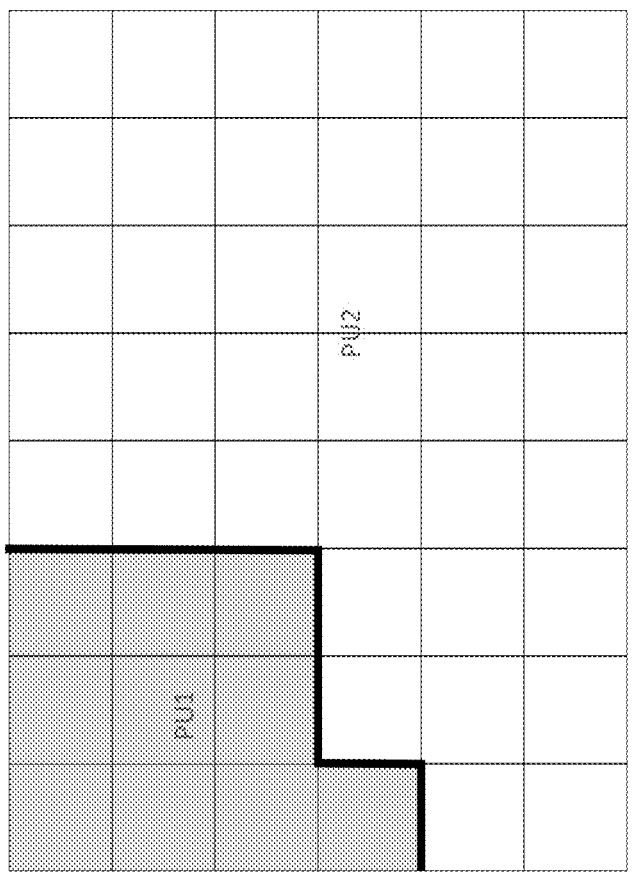
FIG. 22 shows an example of division of a block to two wedgelet sub-regions.

IBC/intra may be applied to N (N>1) sub-regions within a block which is split into two or multiple triangular or wedgelet sub-regions.
1. Some examples of sub-regions generated from the triangular/wedgelet partitions are given as follow:
   a. An example of a block split to two triangular regions is depicted in FIG. 20.
   b. An example of a block split to four triangular regions is depicted in FIG. 21.
   c. An example of a block split to two triangular regions is depicted in FIG. 22.

Combinations of Modes for Sub-Regions
2. When one block is split to multiple sub-regions, all the sub-regions may be coded with the IBC mode, however, with at least two of them are coded with different motion vectors (a.k.a BVs).
   a. In one example, a motion vector(MV) or a motion vector differences (MVD) of a motion vector derived according to a MV predictor for a sub-region may be coded.
      i. In one example, predictive coding of motion vectors of sub-regions relative to motion vector predictors may be used.
      ii. In one example, motion vector predictors may be derived from a conventional IBC AMVP candidate list.
      iii. In one example, predictive coding of motion vector of one sub-region relative to another sub-region may be used.
      iv. In one example, sub-regions may share a single AMVP candidate list.
      v. In one example, sub-regions may utilize different AMVP candidate lists.
   b. In one example, motion vectors of sub-regions may be inherited or derived from MV candidate indices.
      i. In one example, a motion vector of a sub-region may be derived from a conventional IBC merge candidate list.
      ii. In one example, a motion vector of a sub-region may be derived from a MV candidate list which may be different from the conventional IBC merge candidate list construction process.

1. In one example, different spatial neighboring (adjacent or non-adjacent) blocks may be checked in the MV candidate list.
    iii. Candidate indices may be signaled or derived.
        1. Predictive coding of candidate indices may be applied. For example, candidate index of one sub-region may be predicted from that of another sub-region.
    iv. In one example, sub-regions may share a single merge candidates list.
    v. In one example, sub-regions may utilize different merge candidate lists.
  c. In one example, motion vectors of one sub-region may be inherited or derived from MV candidate indices; and MVs/MVDs of another sub-region may be coded.
  d. In one example, motion vectors (MVs) of a sub-region may be derived from a MV candidate list (e.g., conventional IBC merge candidate list).
    i. In one example, the first M (e.g., M=N) candidates in the candidate list may be utilized.
3. When one block is split to multiple sub-regions, at least one of the sub-regions may be coded with the IBC mode, and another one may be coded with a non-IBC mode.
  a. In one example, the another one may be coded with intra mode.
  b. In one example, the another one may be coded with inter mode.
  c. In one example, the another one may be coded with palette mode.
  d. In one example, the another one may be coded with PCM mode.
  e. In one example, the another one may be coded with RDPCM mode.
  f. The motion vector of the IBC-coded sub-region may be obtained using the sub-bullets in bullet 2.
4. When one block is split to multiple sub-regions, at least one of the sub-regions may be coded with the intra mode, and another one may be coded with non-intra mode.
  a. In one example, the another one may be coded with inter mode.
  b. The motion vector of the inter-coded sub-region may be obtained using the ways for conventional inter-coded blocks.
5. When one block is split to multiple sub-regions, all the sub-regions may be coded with the palette mode, however, with at least two of them are coded with different palettes.
6. When one block is split to multiple sub-regions, at least one of the sub-regions may be coded with palette mode, and another one may be coded with non-palette mode.
7. The proposed method may only be applied to a certain component (or certain components), such as the luma component.
  a. Alternatively, furthermore, when the proposed method is applied to one color component, but not applied to the other color component, the corresponding block in the other color component may be coded as a whole block without splitting.
    i. Alternatively, furthermore, the coding method for the whole block in the other color component may be pre-defined, such as IBC/Inter/Intra.
  b. Alternatively, the proposed method may be applied to all components.
    i. In one example, the chroma block may be split following the same splitting pattern as the luma component.
    ii. In one example, the chroma block may be split with a different splitting pattern to the luma component.

Generation of Final Prediction Block

8. When one block is split to multiple sub-regions, prediction of each sub-region may be firstly generated, and final prediction block is obtained with all the predictions.
  a. Alternatively, intermediate prediction blocks using the information of each sub-region may be generated. And final prediction block is obtained by weighted average of the intermediate prediction blocks.
    i. In one example, equal weights may be used.
    ii. In one example, unequal weights including (0, . . . , 0, 1) weights may be applied.
    iii. In one example, one or multiple sets of weights may be predefined to combine intermediate prediction blocks.
    iv. In one example, IBC may be treated as an inter mode and CIIP weights may be applied to combine intra prediction and IBC prediction.
    v. In one example, the weights on a sample may be dependent on the relative position of the sample within current block.
    vi. In one example, the weights on a sample may be dependent on the sample position relative to sub-regions edges.
    vii. In one example, the weights may be dependent on the coded information of current block, such as intra prediction mode, block dimensions, color component, color formats.

Storage of Coded Information

9. When above methods are applied, motion information of one sub-region may be stored as the motion information of the whole block.
  a. Alternatively, the motion information may be stored for each basic unit like normal inter mode (e.g., minimum CU size).
    i. For a basic unit covering multiple sub-regions, one set of motion information may be selected/derived and stored.
  b. In one example, the stored motion information may be utilized in the in-loop filtering process (e.g., deblocking filter).
  c. In one example, the stored motion information may be utilized in coding of subsequent blocks.

Interactions with Other Tools

Figure 23:
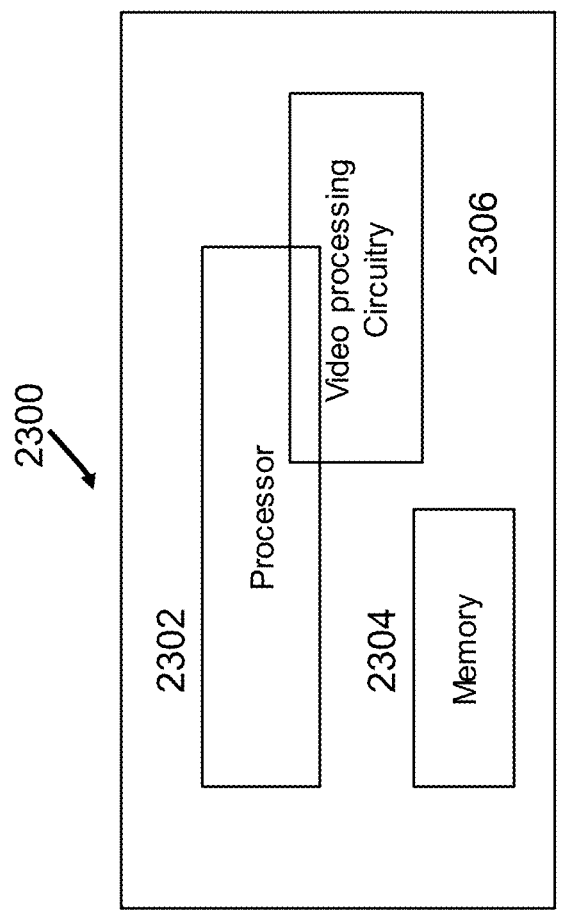
FIG. 23 is a block diagram of an example of a video processing apparatus.

10. When above methods are applied, the IBC HMVP table may not be updated.
  a. Alternatively, one or multiple of the motion vectors for IBC-coded sub-regions may be used to update the IBC HMVP table.
11. When above methods are applied, the non-IBC HMVP table may not be updated.
  a. Alternatively, one or multiple of the motion vectors for inter-coded sub-regions may be used to update the non-IBC HMVP table.
12. The in-loop filtering process (e.g., deblocking procedure) may depend on the usage of above methods.
  a. In one example, samples in blocks coded with above methods may be not filtered.

b. In one example, blocks coded with above methods may be treated in a similar way as the conventional IBC coded blocks.
13. Certain coding methods (e.g., sub-block transform, affine motion prediction, multiple reference line intra prediction, matrix-based intra prediction, symmetric MVD coding, merge with MVD decoder side motion derivation/refinement, bi-directional optimal flow, reduced secondary transform, multiple transform set, etc.) may be disabled for blocks coded with above methods.
14. Indication of usage of the above methods and/or weighting values may be signaled in sequence/picture/slice/tile group/tile/brick/CTU/CTB/CU/PU/TU/other video unit-level or derived on-the-fly.
   a. In one example, the above method may be treated as a special IBC mode.
      i. Alternatively, furthermore, if one block is coded as IBC mode, further indications of using conventional whole-block based IBC method or above method may be signaled or derived.
      ii. In one example, the subsequent IBC-coded blocks may utilize the motion information of the current block as a MV predictor.
         1. Alternatively, the subsequent IBC-coded blocks may be disallowed to utilize the motion information of the current block as a MV predictor.
   b. In one example, the above method may be treated as a special triangular mode. That is, if one block is coded as triangular mode, further indications of using conventional TPM mode or above method may be signaled or derived.
   c. In one example, the above method may be treated as a new prediction mode. That is, the allowed modes such as intra, inter and IBC, may be further extended to include this new mode.
15. Whether and/or how to apply the above methods may depend on the following information:
   a. A message signalled in the DPS/SPS/VPS/PPS/APS/picture header/slice header/tile group header/Largest coding unit (LCU)/Coding unit (CU)/LCU row/group of LCUs/TU/PU block/Video coding unit
   b. Position of CU/PU/TU/block/Video coding unit
   c. Block dimension of current block and/or its neighbouring blocks
   d. Block shape of current block and/or its neighbouring blocks
   e. The intra mode of the current block and/or its neighbouring blocks
   f. The motion/block vectors of its neighbouring blocks
   g. Indication of the colour format (such as 4:2:0, 4:4:4)
   h. Coding tree structure
   i. Slice/tile group type and/or picture type
   j. Colour component (e.g. may be only applied on chroma components or luma component)
   k. Temporal layer ID
   l. Profiles/Levels/Tiers of a standard FIG. 23 is a block diagram of a video processing apparatus 2300. The apparatus 2300 may be used to implement one or more of the methods described herein. The apparatus 2300 may be embodied in a smartphone, tablet, computer, Internet of Things (IoT) receiver, and so on. The apparatus 2300 may include one or more processors 2302, one or more memories 2304 and video processing hardware 2306. The processor(s) 2302 may be configured to implement one or more methods described in the present document. The memory (memories) 2304 may be used for storing data and code used for implementing the methods and techniques described herein. The video processing hardware 2306 may be used to implement, in hardware circuitry, some techniques described in the present document. The video processing hardware 2306 may be partially or completely includes within the processor(s) 2302 in the form of dedicated hardware, or graphical processor unit (GPU) or specialized signal processing blocks.

The following clauses describe some embodiments and techniques. Some examples of wedgelet and triangular partitioning are given in FIGS. 20 to 22. For example, wedgelet partitioning may partition a block into portions wherein boundaries of the portion form a stair-case pattern or have a vertical portion and a horizontal portion that meet in a corner. For example, triangular partition may include partitioning into sub-blocks so that adjacent sub-blocks are separated by non-horizontal or non-vertical partitioning.

Figure 24:
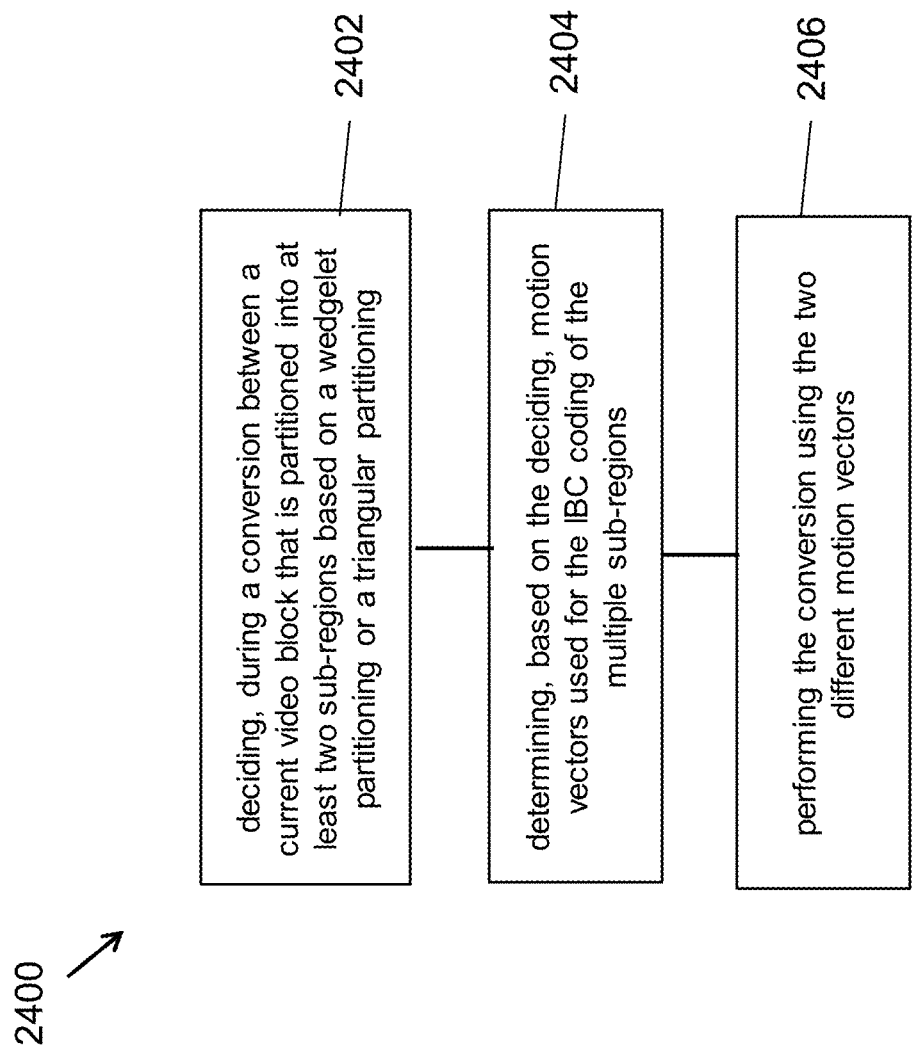
FIG. 24 is a flowchart for an example of a video processing method.

1. A method of video processing (e.g., method 2400 depicted in FIG. 24), comprising deciding (2402), during a conversion between a current video block that is partitioned into at least two sub-regions based on a wedgelet partitioning or a triangular partitioning and a bitstream representation of the current video block, that the conversion of each sub-region is based on a coding method that uses a current picture as a reference picture, determining (2404), based on the deciding, motion vectors used for the IBC coding of the multiple sub-regions; and performing (2406) the conversion using the two different motion vectors.
2. The method of clause 1, wherein the bitstream representation includes an indication of a motion vector for a given sub-region of the multiple sub-regions or a motion vector difference for the given sub-region derived from a corresponding motion vector predictor.
3. The method of clause 2, wherein the motion vector predictor is derived from an IBC motion vector predictor list.
4. The method of any of clauses 1-2, wherein the motion vectors are determined using an inheriting operation or a deriving operation in which the motion vectors are inherited of derived.
5. The method of clause 4, wherein the deriving operation comprises deriving a motion vector for a sub-region based on an IBC merge candidate list.
6. The method of any of clauses 1-2, wherein motion vectors of one subset of sub-regions are inherited or derived and motion vectors of another subset of sub-regions are signaled in the bitstream representation.
7. The method of clause 1, wherein the coding method comprises intra block copy (IBC).
Item 2 in the previous section provides additional examples and variants of the above clauses.
8. A method of video processing, comprising: deciding, during a conversion between a current video block that is partitioned into at least two sub-regions based on a wedgelet partitioning or a triangular partitioning and a bitstream representation of the current video block, that the conversion of one sub-region is based on a coding method that uses a current picture as a reference picture and the conversion of another sub-region is based on another coding mode that is different from the IBC coding mode; and performing the conversion based on the deciding.
9. The method of clause 1, wherein the another coding mode is an intra coding mode.
10. The method of clause 1, wherein the another coding mode is an inter coding mode.

11. The method of clause 1, wherein the another coding mode is a palette coding mode.
12. The method of clause 8-11, wherein the coding method comprises (IBC).

Item 3 in the previous section provides additional examples and variants of the above clauses.

12. A method of video processing, comprising: deciding, during a conversion between a current video block that is partitioned into at least two sub-regions based on a wedgelet partitioning or a triangular partitioning and a bitstream representation of the current video block, that the conversion of one sub-region is based on an intra coding mode and the conversion of another sub-region is based on another coding mode that is different from the intra coding mode; and performing the conversion based on the deciding.
13. The method of clause 12, wherein the another coding mode is an inter coding mode.

Item 4 in the previous section provides additional examples and variants of the above clauses.

14. A method of video processing, comprising: determining, during a conversion between a current video block that is partitioned into sub-regions based on a wedgelet partitioning or a triangular partitioning and a bitstream representation of the current video block, that the sub-regions are coded based on a palette coding mode and palettes used for at least two sub-regions are different from each other; and performing the conversion based on the determining.

Item 5 in the previous section provides additional examples and variants of the above clauses.

15. A method of video processing, comprising: deciding, during a conversion between a current video block that is partitioned into at least two sub-regions based on a wedgelet partitioning or a triangular partitioning and a bitstream representation of the current video block, that the conversion of one sub-region is based on a palette coding mode and the conversion of another sub-region is based on another coding mode that is different from the palette coding mode; and performing the conversion based on the deciding.

Item 6 in the previous section provides additional examples and variants of the above clauses.

16. A method of video processing, comprising: performing a conversion between a block of a component of video and a bitstream representation of the block using a method recited in any one of above clauses, such that a conversion between a corresponding block of another component of the video is performed using a different coding technique than that used for the conversion of the block.

Item 7 in the previous section provides additional examples and variants of the above clauses.

17. A method of video processing, comprising: determining, during a conversion between a current video block that is partitioned into at least two sub-regions based on a wedgelet partitioning or a triangular partitioning and a bitstream representation of the current video block, a final prediction for the current video block using predictions of each sub-region; and performing the conversion based on the deciding.
18. The method of clause 17, wherein the determining is based on a weighted prediction of the predictions of each sub-region.
19. The method of clause 18, wherein equal weights are applied to predictions of each sub-region for the determining the weighted prediction.

Item 8 in the previous section provides additional examples and variants of the above clauses.

20. A method of video processing, comprising: storing, during a conversion between a current video block that is partitioned into at least two sub-regions based on a wedgelet partitioning or a triangular partitioning and a bitstream representation of the current video block, motion information of a sub-region as motion information of the current video block; and using the motion information for conversion of the current video block or subsequent video blocks.
21. The method of clause 20, wherein the using the motion information includes using the motion information for in-loop filtering during the conversion.

Item 9 in the previous section provides additional examples and variants of the above clauses.

22. The method of any of clauses 1 to 21, further including: selectively updating, after performing the conversion of the current video block, a motion vector predictor table based on an updating rule.
23. The method of clause 22, wherein the rule specifies that an intra block copy history-based motion vector predictor is not updated.
24. The method of clause 22, wherein the rule specifies that an intra block copy history-based motion vector predictor is updated using motion vectors of specific sub-regions.

Item 10 in the previous section provides additional examples and variants of the above clauses.

25. The method of clause 22, wherein the rule specifies than history-based motion vector predictor table for a non-intra block copy mode is not updated.

Item 11 in the previous section provides additional examples and variants of the above clauses.

26. The method of any of clauses 1 to 25, wherein the conversion comprises suppressing deblocking of the current video block during the conversion.
27. The method of any of clauses 1 to 25, wherein the conversion is performed by disabling another video coding method during performing the method.
28. The method of clause 27, wherein the another video coding method includes a sub-block transform method, an affine motion prediction method, a multiple reference line intra prediction method, a matrix-based intra prediction method, a symmetric motion vector difference (MVD) coding, a merge with MVD decoder side motion derivation/refinement, a bi-directional optimal flow, a reduced secondary transform, or multiple transform set coding method.
29. The method of any of clauses 1 to 28, wherein a use of the method during the conversion corresponds to a signaling in the bitstream representation at a slice level or a picture level or a sequence level or a tile group level or a tile level or a brick level or a coding tree unit level or a coding tree block level or a coding unit level or a prediction unit level or a transform unit level.

Items 12, 13 and 14 in the previous section provides additional examples and variants of the above clauses.

30. The method of any of clauses 1 to 29, wherein the wedgelet partitioning includes partitioning the current video block into portions having a border with at least one horizontal portion and at least one vertical portion joined in a corner.
31. The method of any of clauses 1 to 30, wherein the triangular partitioning includes partitioning the current video block into portions having a border that is along a non-horizontal and a non-vertical direction.

32. The method of any of clauses 1 to 31, wherein the conversion includes generating the bitstream representation from the current video block.

33. The method of any of clauses 1 to 31, wherein the conversion includes generating samples of the current video block from the bitstream representation.

34. A video processing apparatus comprising a processor configured to implement a method recited in any one or more of clauses 1 to 33.

35. A computer readable medium having code stored thereon, the code, upon execution, causing a processor to implement a method recited in any one or more of clauses 1 to 33.

Figure 25:
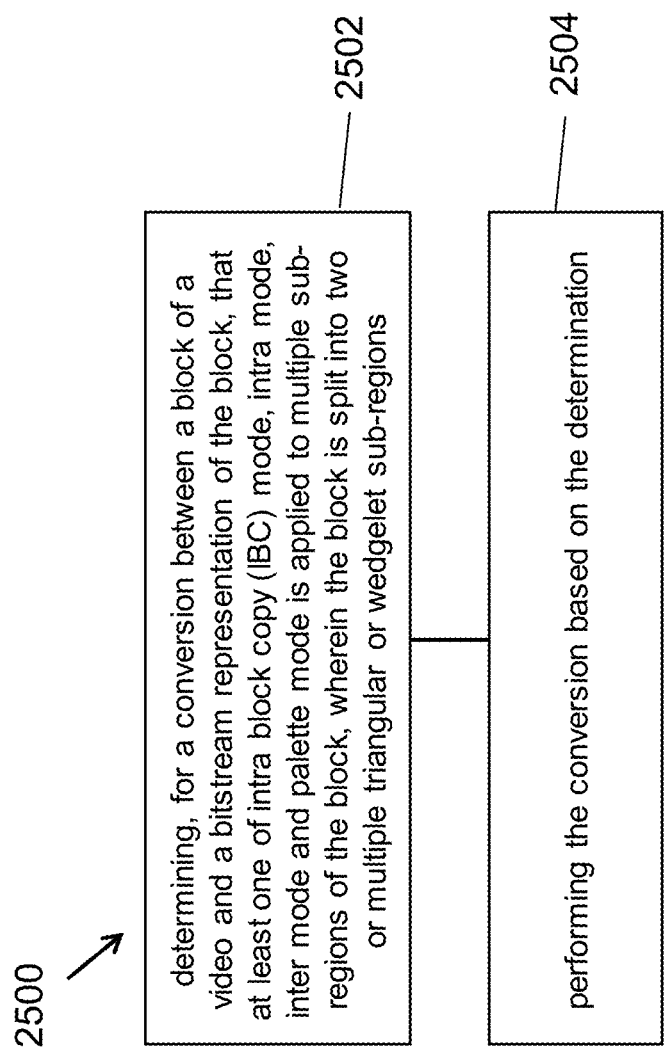
FIG. 25 is a flowchart for an example of a video processing method.

FIG. 25 is a flowchart for an example method 2500 of video processing. The method 2500 includes, at 2502, determining, for a conversion between a block of a video and a bitstream representation of the block, that at least one of intra block copy (IBC) mode, intra mode, inter mode and palette mode is applied to multiple sub-regions of the block, wherein the block is split into two or multiple triangular or wedgelet sub-regions; and at 2504, performing the conversion based on the determination.

In some examples, the IBC mode uses reference samples within at least one of a current slice, tile, brick, picture, other vide unit including coding tree unit (CTU) row.

In some examples, the block is split into two triangular sub-regions by applying either a diagonal split or an anti-diagonal split to the block.

In some examples, the block is split into four triangular sub-regions by applying both a diagonal split and an anti-diagonal split to the block.

In some examples, the block is split into two wedgelet sub-regions with predetermined shapes.

In some examples, when the block is split to multiple sub-regions, all the sub-regions are coded with the IBC mode, wherein at least two of multiple sub-regions are coded with different motion vectors (MVs).

In some examples, a MV or a motion vector differences (MVD) of a MV derived according to a motion vector predictor for a sub-region is coded.

In some examples, predictive coding of motion vectors of sub-regions relative to motion vector predictors is used.

In some examples, motion vector predictors are derived from a conventional IBC Advanced motion vector prediction (AMVP) candidate list.

In some examples, predictive coding of motion vectors of one sub-region relative to another sub-region is be used.

In some examples, the multiple sub-regions share a single AMVP candidate list.

In some examples, the multiple sub-regions use different AMVP candidate lists.

In some examples, motion vectors of the sub-regions are inherited or derived from MV candidate indices.

In some examples, a motion vector of a sub-region is derived from a conventional IBC merge candidate list.

In some examples, a motion vector of a sub-region is derived from a MV candidate list which is different from the conventional IBC merge candidate list construction process.

In some examples, different spatial neighboring adjacent or non-adjacent blocks are checked in the MV candidate list.

In some examples, candidate indices are signaled or derived.

In some examples, predictive coding of candidate indices is applied.

In some examples, candidate index of one sub-region is predicted from that of another sub-region.

In some examples, the multiple sub-regions share a single merge candidate list.

In some examples, the multiple sub-regions use different merge candidate list.

In some examples, motion vectors of one sub-region are inherited or derived from MV candidate indices, and MVs and/or MVDs of another sub-region are coded.

In some examples, MVs of a sub-region is derived from a MV candidate list.

In some examples, the MV candidate list is a conventional IBC merge candidate list. In some examples, the first M candidates in the candidate list is utilized.

In some examples, when the block is split to multiple sub-regions, at least one of the sub-regions is coded with the IBC mode, and another one is coded with a non-IBC mode.

In some examples, the another one is coded with intra mode.

In some examples, the another one is coded with inter mode.

In some examples, the another one is coded with palette mode.

In some examples, the another one is coded with pulse coded modulation (PCM) mode.

In some examples, the another one is coded with residual differential pulse coded modulation (RDPCM) mode.

In some examples, motion vector of the sub-region coded with the IBC mode is obtained using the same ways as the above sub-regions coded with the IBC mode.

In some examples, when the block is split to multiple sub-regions, at least one of the sub-regions is coded with the intra mode, and another one is coded with a non-intra mode. In some examples, the another one is coded with inter mode.

In some examples, motion vector of the inter-coded sub-region is obtained using the ways for conventional inter-coded blocks.

In some examples, when the block is split to multiple sub-regions, all the sub-regions are coded with the palette mode, wherein at least two of the sub-regions are coded with different palettes.

In some examples, when the block is split to multiple sub-regions, at least one of the sub-regions is coded with the palette mode, and another one is coded with a non-palette mode.

In some examples, the method is applied to one or more certain components.

In some examples, the certain component is luma component.

In some examples, when the method is applied to one color component, but not applied to the other color component, the corresponding block in the other color component is coded as a whole block without splitting.

In some examples, the coding method for the whole block in the other color component is pre-defined, and is one of IBC mode, Inter mode and Intra mode.

In some examples, the method is applied to all components.

In some examples, a chroma block of the block of the video is split following the same splitting pattern as the luma component.

In some examples, a chroma block of the block of the video is split with a different splitting pattern to the luma component.

In some examples, when one block is split to multiple sub-regions, prediction of each sub-region is firstly generated, and final prediction block is obtained with all the predictions.

In some examples, when one block is split to multiple sub-regions, intermediate prediction blocks using the information of each sub-region is generated, and final prediction block is obtained by weighted average of the intermediate prediction blocks.

In some examples, equal weights are used.

In some examples, unequal weights are applied.

In some examples, one or multiple sets of weights are predefined to combine intermediate prediction blocks.

In some examples, IBC mode is treated as an inter mode and Combined intra-inter prediction (CIIP) weights are applied to combine intra prediction and IBC prediction.

In some examples, the weight on a sample is dependent on the relative position of the sample within the current block.

In some examples, the weight on a sample is dependent on the sample position relative to sub-regions edges.

In some examples, the weights are dependent on the coded information of current block including at least one of intra prediction mode, block dimensions, color component and color formats.

In some examples, when the methods are applied, motion information of one sub-region is stored as the motion information of the whole block.

In some examples, when the methods are applied, motion information of sub-regions are stored for each basic unit, the basic unit having a minimum CU size.

In some examples, for a basic unit covering multiple sub-regions, one set of motion information is selected or derived and stored.

In some examples, the stored motion information is utilized in the in-loop filtering process.

In some examples, the stored motion information is utilized in coding of subsequent blocks.

In some examples, when the methods are applied, IBC history-based motion vector prediction (HMVP) table cannot be updated.

In some examples, one or multiple of motion vectors for IBC-coded sub-regions are used to update the IBC HMVP table.

In some examples, when the methods are applied, non-IBC history-based motion vector prediction (HMVP) table cannot be updated.

In some examples, when the methods are applied, one or multiple of motion vectors for inter-coded sub-regions are used to update the non-IBC HMVP table.

In some examples, in-loop filtering process for the block depends on usage of the methods.

In some examples, samples in blocks coded with the methods are not filtered.

In some examples, blocks coded with the methods are treated in a similar way as the conventional IBC coded blocks.

In some examples, certain coding methods are disabled for blocks coded with the methods.

In some examples, the certain coding methods includes one or more of sub-block transform, affine motion prediction, multiple reference line intra prediction, matrix-based intra prediction, symmetric MVD coding, merge with MVD decoder side motion derivation/refinement, bi-directional optimal flow, reduced secondary transform, multiple transform set.

In some examples, indication of usage of the methods and/or weighting values is signaled in at least one of sequence, picture, slice, tile group, tile, brick, CTU, CTB, CU, PU, TU, other video unit-level or derived on-the-fly.

In some examples, the above method is treated as a special IBC mode.

In some examples, if one block is coded as IBC mode, further indications of using conventional whole-block based IBC method or the above method is signaled or derived.

In some examples, the subsequent IBC-coded blocks utilize the motion information of the current block as a MV predictor.

In some examples, the subsequent IBC-coded blocks are disallowed to utilize the motion information of the current block as a MV predictor.

In some examples, the above method is treated as a special triangular mode.

In some examples, if one block is coded as triangular mode, further indications of using conventional Triangular Prediction mode (TPM) method or the above method is signaled or derived.

In some examples, the above method is treated as a new prediction mode.

In some examples, the allowed modes including intra mode, inter mode and IBC mode are further extended to include the new prediction mode.

In some examples, whether and/or how to apply the above methods depend on the following information:
 a. a message signaled in at least one of DPS, SPS, VPS, PPS, APS, picture header, slice header, tile group header, Largest coding unit (LCU), Coding unit (CU), LCU row, group of LCUs, TU, PU block, Video coding unit;
 b. position of at least one of CU, PU, TU, block, Video coding unit;
 c. block dimension of current block and/or its neighbouring blocks;
 d. block shape of current block and/or its neighbouring blocks;
 e. the intra mode of the current block and/or its neighbouring blocks;
 f. the motion or block vectors of its neighbouring blocks;
 g. indication of color format including one of 4:2:0, 4:4:4;
 h. coding tree structure; and
 i. slice or tile group type and/or picture type.

In some examples, the conversion generates block of a video from the bitstream representation.

In some examples, the conversion generates the bitstream representation from block of a video.

The disclosed and other solutions, examples, embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of any subject matter or of what may be claimed, but rather as descriptions of features that may be specific to particular embodiments of particular techniques. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

The invention claimed is:

1. A method of processing video data, comprising:
   making a determination, for a conversion between a block of a video and a bitstream of the block, that an intra block copy (IBC) mode is applied to multiple sub-regions of the block, wherein the block is split into two or multiple triangular or wedgelet sub-regions; and
   performing the conversion based on the determination,
   wherein, in the IBC mode, prediction samples are derived from blocks of sample values of a same decoded slice as determined by block vectors;
   wherein, when one block is split into the multiple sub-regions, intermediate prediction blocks are generated using information of each sub-region, and wherein a final prediction block is obtained based on a weighted average of the intermediate prediction blocks.

2. The method of claim 1, wherein the block is split into four triangular sub-regions by applying both a diagonal split and an anti-diagonal split to the block.

3. The method of claim 1, wherein the block is split into two wedgelet sub-regions with predetermined shapes.

4. The method of claim 1, wherein, when the block is split into the multiple sub-regions, all of the multiple sub-regions are coded with the IBC mode, and wherein at least two of the multiple sub-regions are coded with different motion vectors (MVs).

5. The method of claim 1, wherein, when the block is split into the multiple sub-regions, at least one of the multiple sub-regions is coded with the IBC mode, and another one is coded with a non-IBC mode.

6. The method of claim 1, wherein the method is applied to one or more components of the block.

7. The method of claim 6, wherein, when the method is applied to one color component and not applied to an other color component, a corresponding block in the other color component is coded as a whole block without splitting.

8. The method of claim 1, wherein the IBC mode is treated as an inter mode and combined intra-inter prediction (CIIP) weights are applied to combine intra prediction and IBC prediction.

9. The method of claim 1, wherein, when the method is applied, motion information of one sub-region is stored as motion information of the block as a whole.

10. The method of claim 1, wherein, when the method is applied, motion information of sub-regions is stored for each basic unit, and wherein a basic unit has a minimum coding unit (CU) size.

11. The method of claim 1, wherein, when the method is applied, an IBC history-based motion vector prediction (HMVP) table cannot be updated.

12. The method of claim 1, wherein one or more motion vectors for IBC-coded sub-regions are used to update an IBC history-based motion vector prediction (HMVP) table.

13. The method of claim 1, wherein, when the method is applied, a non-IBC history-based motion vector prediction (HMVP) table cannot be updated.

14. The method of claim 1, wherein, when the method is applied, one or more motion vectors for inter-coded sub-regions are used to update a non-IBC history-based motion vector prediction (HMVP) table.

15. The method of claim 1, wherein in-loop filtering process for the block depends on usage of the method.

16. The method of claim 1, wherein the conversion includes encoding the block of the video into the bitstream.

17. The method of claim 1, wherein the conversion includes decoding the block from the bitstream.

18. An apparatus for processing video data comprising a processor and a non-transitory memory with instructions thereon, wherein the instructions upon execution by the processor, cause the processor to:
make a determination, for a conversion between a block of a video and a bitstream of the block, that an intra block copy (IBC) mode is applied to multiple sub-regions of the block, wherein the block is split into two or multiple triangular or wedgelet sub-regions; and
perform the conversion based on the determination,
wherein, in the IBC mode, prediction samples are derived from blocks of sample values of a same decoded slice as determined by block vectors;
wherein, when one block is split into the multiple sub-regions, intermediate prediction blocks are generated using information of each sub-region, and wherein a final prediction block is obtained based on a weighted average of the intermediate prediction blocks.

19. A non-transitory computer-readable recording medium storing a bitstream of a video which is generated by a method performed by a video processing apparatus, wherein the method comprises:
making a determination that an intra block copy (IBC) mode is applied to multiple sub-regions of a block of the video, wherein the block is split into two or multiple triangular or wedgelet sub-regions; and
generating the bitstream based on the determination,
wherein in the IBC mode, prediction samples are derived from blocks of sample values of a same decoded slice as determined by block vectors;
wherein, when one block is split into the multiple sub-regions, intermediate prediction blocks are generated using information of each sub-region, and wherein a final prediction block is obtained based on a weighted average of the intermediate prediction blocks.

20. The apparatus of claim 18, wherein the conversion includes decoding the block from the bitstream.

* * * * *